(12) United States Patent
Bradford et al.

(10) Patent No.: US 8,978,839 B2
(45) Date of Patent: Mar. 17, 2015

(54) PNEUMATIC BRAKE ACTUATOR WITH FLOW INSENSITIVE TWO WAY CONTROL VALVE

(75) Inventors: Aaron C. Bradford, Olathe, KS (US); Albert D. Fisher, Kansas City, MO (US)

(73) Assignee: Haldex Brake Products Corporation, Kansas City, MO (US)

( * ) Notice: Subject to any disclaimer, the term of this patent is extended or adjusted under 35 U.S.C. 154(b) by 269 days.

(21) Appl. No.: 13/465,126

(22) Filed: May 7, 2012

(65) Prior Publication Data

US 2013/0292216 A1  Nov. 7, 2013

(51) Int. Cl.
*F16D 65/14* (2006.01)

(52) U.S. Cl.
USPC .......................................... 188/106 F; 92/63

(58) Field of Classification Search
USPC ............ 188/106 F, 166, 170, 71.1, 72.1, 73.1
See application file for complete search history.

(56) References Cited

U.S. PATENT DOCUMENTS

| 5,372,059 | A  | 12/1994 | Pierce et al. |
| 5,671,654 | A  | 9/1997  | Plantan |
| 5,722,311 | A  | 3/1998  | Pierce et al. |
| 6,588,314 | B1 | 7/2003  | Stojic |
| 6,907,818 | B2 | 6/2005  | Anderson |
| 7,121,191 | B1 | 10/2006 | Fisher |
| 7,395,906 | B2 | 7/2008  | Potter et al. |
| 7,513,341 | B2 | 4/2009  | Lachermeier |
| 7,845,474 | B2 | 12/2010 | Schodrowski et al. |
| 8,196,718 | B2 | 6/2012  | Savagner et al. |
| 2008/0116741 | A1 | 5/2008 | Brandt et al. |
| 2013/0032437 | A1 | 2/2013 | Akin et al. |

FOREIGN PATENT DOCUMENTS

| EP | 0554050 A1 | 8/1993 |
| GB | 1237641 | 6/1997 |
| WO | WO 01/68429 | 9/2001 |
| WO | 2004/002799 | 1/2004 |
| WO | WO 2004/002799 A1 | 1/2004 |
| WO | WO 2007/039093 A1 | 4/2007 |
| WO | WO 2009/075658 A2 | 6/2009 |
| WO | WO 2012/164587 | 12/2012 |

OTHER PUBLICATIONS

European Search Report dated Sep. 24, 2013 from related European Application No. 13159285.9 filed Mar. 14, 2013.

*Primary Examiner* — Pamela Rodriguez
(74) *Attorney, Agent, or Firm* — Stinson Leonard Street LLP

(57) ABSTRACT

A pneumatic brake actuator has a spring brake actuator with spring and spring brake pressure chambers, and a service brake actuator with service brake pressure and pushrod chambers. A control valve has a seal that is moveable between an open position and a closed position for regulating fluid flow between the spring chamber and service brake pressure chamber. A first surface of the seal is in fluid communication with the service brake pressure chamber and a second surface of the seal is in fluid communication with a valve chamber that is not in fluid communication with the service brake pressure chamber or spring chamber. The seal moves between its open and closed positions based on a pressure in the service brake pressure chamber. Movement of the seal is not dependent on the rate of flow of fluid between the spring chamber and the service brake pressure chamber.

20 Claims, 19 Drawing Sheets

PNEUMATIC BRAKE ACTUATOR WITH FLOW INSENSITIVE TWO WAY CONTROL VALVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention is directed generally to pneumatic brake actuators, and more specifically to a pneumatic brake actuator with a two-way control valve.

2. Description of Related Art

A pneumatic brake system for a large, heavy-duty vehicle such as a bus, truck, semi-tractor, or trailer typically includes a brake shoe and drum assembly which is actuated by an actuator that is operated by the selective application of compressed air. Conventional pneumatic spring brake actuators have both a service brake actuator for actuating the brakes under normal driving conditions by the application of compressed air and a spring-type emergency brake actuator which actuates the brakes when air pressure has been released from a pressure chamber. The emergency brake actuator, or spring brake, includes a strong compression spring which applies the brake when air is released.

There are two main types of pneumatic brake actuators, piston type actuators and diaphragm type actuators. In the diaphragm type brake actuator, two pneumatic diaphragm brake actuators are typically arranged in a tandem configuration, which includes a pneumatic service brake actuator for applying the normal operating brakes of the vehicle, and a spring brake actuator for applying the parking or emergency brakes of the vehicle. Both the service brake actuator and the spring brake actuator include a housing having an elastomeric diaphragm dividing the interior of the housing into two distinct fluid chambers. The piston type brake actuator is substantially similar to the diaphragm type, except that instead of a diaphragm, a piston reciprocates in a cylinder for applying the normal and/or parking brakes of the vehicle.

In a typical service brake actuator, the service brake housing is divided into a pressure chamber and a pushrod chamber. The pressure chamber is fluidly connected to a source of pressurized air and the pushrod chamber mounts a pushrod that is coupled to the brake assembly. The introduction and exhaustion of pressurized air in to and out of the pressurized chamber reciprocates the pushrod in to and out of the housing to apply and release the operating brakes.

In a typical spring brake actuator, the spring brake section is divided into a pressure chamber and a spring chamber by a diaphragm. A pressure plate is positioned in the spring chamber between the diaphragm and a strong compression spring, whose opposing end abuts the housing of the section. In one well-known configuration, an actuator tube extends through the pressure plate, through the diaphragm, into the pressure chamber, and through a dividing wall separating the spring brake actuator from the service brake actuator. The end of the actuator tube is fluidly connected to the pressure chamber of the service brake actuator.

When applying the parking brakes, the spring brake actuator pressure is discharged from the pressure chamber and the large force compression spring pushes the pressure plate and the diaphragm toward the dividing wall between the spring brake actuator and the service brake actuator. In this position, the actuator tube connected to the pressure plate is pushed for applying the parking or emergency brakes and thus immobilizing the vehicle. To release the parking brake, pressurized air is introduced into the pressure chamber of the spring brake actuator to expand the pressure chamber, move the diaphragm and pressure plate toward the opposing end of the spring brake actuator housing, and compress the compression spring.

One known problem in association with spring brake actuators of this design is that as the large force compression spring is compressed, the pressure chamber increases in volume and the spring chamber decreases in volume, resulting in a pressure increase in the spring chamber. The build-up of pressure in the spring chamber upon the release of the brake is highly undesirable in that any pressure build-up in the spring chamber must be offset by an increased pressure in the pressure chamber in order to fully compress the spring and thus fully release the brake.

The undesirable effects of pressure build-up in the spring chamber are exacerbated due to the fact that most pressurized air systems for heavy-duty vehicles operate at an industry standard maximum pressure. If the combined pressure of the spring and the air pressure in the spring chamber approach that maximum pressure then the emergency brake can fail to release, only partially release, or release very slowly, all of which are undesirable.

One solution to prevent pressure increase in the spring chamber is to include vent holes in the spring chamber housing. These vent holes are undesirable because they expose the interior of the spring chamber to external environmental elements such as dirt, salt, and water, which accelerate abrasion, corrosion, or wear on the various internal brake components such as the spring. The damage to the internal brake components by environmental elements can require increased maintenance or cause premature failure of the spring. To prevent environmental elements from entering the spring brake housing, it is known to place a filter over the vent openings. The filtered vent openings, however, inherently permit external air to enter the brake, yielding a brake that is not completely sealed. Additionally, the filters require increased maintenance because they must be cleaned and/or replaced and typically do not effectively prevent water from entering the spring chamber.

An additional problem with directly externally venting the spring chamber is that the types of vehicles on which the actuator is mounted, such as tractor trailers, are often parked for extended periods in a dock bay. The bays are typically sloped and below grade, and under heavy rain or snow conditions can fill with water to a height that floods the interior of the actuator's spring chamber. Although the water is normally expelled from the spring chamber through the vent openings as the brake is released, the flooding can accelerate corrosion and introduce other environmental hazards. Further, if it is below freezing, the water can freeze and prevent release of the brake. Filtered vent openings do not prevent water from flooding the spring chamber.

In order to eliminate the pressure build-up in the spring chamber while keeping out environmental elements, it is known to include a fluid flow path between the spring chamber of the spring brake actuator and the service brake pressure chamber through the actuator tube. In such an actuator, a control valve is placed in the actuator tube to regulate air flow between the spring chamber and service brake pressure chamber. Two types of control valves have been used, two-way control valves and one-way control valves.

One-way control valves allow air to flow from the spring chamber into the service brake pressure chamber to prevent pressure build up in the spring chamber when the volume of the spring chamber decreases. However, when the spring brake is applied and the volume of the spring chamber increases, the one-way valve remains in its closed position and does not allow air to flow from the service brake pressure chamber into the expanding spring chamber. This causes a vacuum to form in the spring chamber such that volume enclosed by the spring chamber is at a negative relative pressure, which reduces the load provided by the parking brakes. In order to overcome the vacuum formation in the spring chamber, it is necessary to use a larger spring in the spring chamber that is capable of overcoming the negative relative pressure caused by the vacuum. While pneumatic brake actuators with one-way control valves typically allow air to enter the spring chamber through the opening that the caging bolt passes through when the spring is caged, this opening is sealed during normal operation of the actuator.

Two-way control valves allow air to vent from the spring chamber when the spring is compressed and they allow air to enter the spring chamber when the spring brake is applied. Conventional two-way control valves, however, are flow rate sensitive, which means that they will only close due to increased pressure in the service brake pressure chamber if the flow of fluid into the service brake pressure chamber and through the valve reaches a certain level. If fluid slowly moves through the valve while the service brake pressure chamber increases, the valve remains open, thereby allowing the pressure to increase in both the service brake pressure chamber and the spring chamber. This results in application of both the service brake and the spring brake which subjects the brake system's components to increased levels of force that may cause damage.

BRIEF SUMMARY OF THE INVENTION

One embodiment of the present invention is directed toward a pneumatic brake actuator having a spring brake actuator coupled with a service brake actuator. The spring brake actuator has a spring chamber and a spring brake pressure chamber, and the service brake actuator has a service brake pressure chamber and a pushrod chamber. A control valve is operable to regulate fluid flow between the spring chamber and the service brake pressure chamber. The control valve includes a seal that is moveable between an open position, in which fluid can flow between the spring chamber and the service brake pressure chamber, and a closed position, in which fluid is blocked from flowing between the spring chamber and the service brake pressure chamber. The seal has a first surface in fluid communication with the service brake pressure chamber and a second surface in fluid communication with a valve chamber that is not in fluid communication with the service brake pressure chamber or the spring chamber. The seal moves between the open position and the closed position based on a pressure in the service brake pressure chamber.

Preferably, the pressure in the service brake pressure chamber is a first pressure and a pressure in the valve chamber is a second pressure. A first force is exerted on the first surface due to the first pressure acting on the first surface, and a second force is exerted on the second surface due to the second pressure acting on the second surface. The seal moves from its open position to its closed position when the first force is greater than the second force. A spring may exert a third force on the second surface, in which case the seal moves from its open position to its closed position when the first force is greater than the sum of the second and third forces.

Preferably, movement of the seal is not dependent on the rate of flow of fluid or pressure differential between the spring chamber and the service brake pressure chamber. The control valve is preferably a pilot operated valve where the pilot pressure is the pressure in the service brake pressure chamber. Preferably, the control valve includes a valve body and the seal is placed within a channel formed in the valve body. When the seal is in its open position, fluid can flow through the channel between the service brake pressure chamber and spring chamber, and when the seal is in its closed position, the channel is blocked. Preferably, the valve chamber is enclosed by the seal and the valve body. The valve chamber may also be vented to the atmosphere. Preferably, a spring biases the seal to its open position. However, it is within the scope of the invention for the seal to be constructed from a material and in a manner that it biases itself to its open position. Alternatively, the pressure in the valve chamber may bias the seal to its open position. The spring chamber is preferably sealed to prevent direct exposure to the atmosphere and common environmental contaminants.

Biasing the control valve to its open position allows air exchange between the spring chamber and the service brake pressure chamber when the service brake pressure chamber is not pressurized. When in its open position, the control valve prevents pressure build-up and vacuum creation in the spring chamber. This allows the spring brake actuator, in a sealed cavity, to be operated without the need for higher spring force to overcome vacuum formation in the spring chamber. The seal is preferably biased to its open position with enough force to overcome a negative pressure differential between the spring chamber and valve chamber that would occur in a sealed spring chamber as the volume of the spring chamber increases during actuation of the spring brake actuator, which prevents vacuum formation in the spring chamber. The control valve seal closes when the pressure in the service brake pressure chamber reaches a threshold level to prevent pressurization of both the service brake pressure chamber and the spring chamber. Because movement of the seal is not dependent on the rate of flow of fluid between the service brake pressure chamber and spring chamber, it closes and prevents fluid from entering the spring chamber when the service brakes are applied slowly.

Many embodiments of control valves are within the scope of the present invention. In one embodiment, the seal of the control valve includes an opening that is in fluid communication with the service brake pressure chamber and spring chamber when the seal is in its open position. Alternatively, the control valve may include a valve body with a channel that is in fluid communication with the service brake pressure chamber and spring chamber when the seal is in its open position and that is blocked when the seal is in its closed position.

The present invention also encompasses a control valve for a pneumatic brake actuator having a spring brake actuator and service brake actuator. The spring brake actuator having a spring chamber and spring brake pressure chamber, and the service brake actuator having a service brake pressure chamber and a pushrod chamber. The control valve has a valve body with an interior surface that defines a channel between the spring chamber and the service brake pressure chamber. A seal is positioned within the channel such that a valve chamber is enclosed by the seal and the valve body. The seal is moveable between an open position, in which fluid can flow through the channel between the spring chamber and service brake pressure chamber, and a closed position, in which fluid is blocked from flowing through the channel. The seal includes a first sealing surface that engages the valve body when the seal is in its closed position, and second and third sealing surfaces each of which engages the valve body to seal the valve chamber from the spring chamber and the service brake pressure chamber. The seal moves between the open position and the closed position based on a pressure in the service brake pressure chamber.

Preferably, the pressure in the service brake pressure chamber is a first pressure and a pressure in the valve chamber is a second pressure. The seal has a first surface that is in fluid communication with the service brake pressure chamber and a second surface that is in fluid communication with the valve chamber. A first force is exerted on the first surface due to the first pressure acting on the first surface, and a second force is exerted on the second surface due to the second pressure acting on the second surface. The seal moves from its open position to its closed position when the first force is greater than the second force. A spring may exert a third force on the second surface, in which case the seal moves from its open position to its closed position when the first force is greater than the sum of the second and third forces. Preferably, movement of the seal is not dependent on the rate of flow of fluid or pressure differential between the spring chamber and the service brake pressure chamber.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
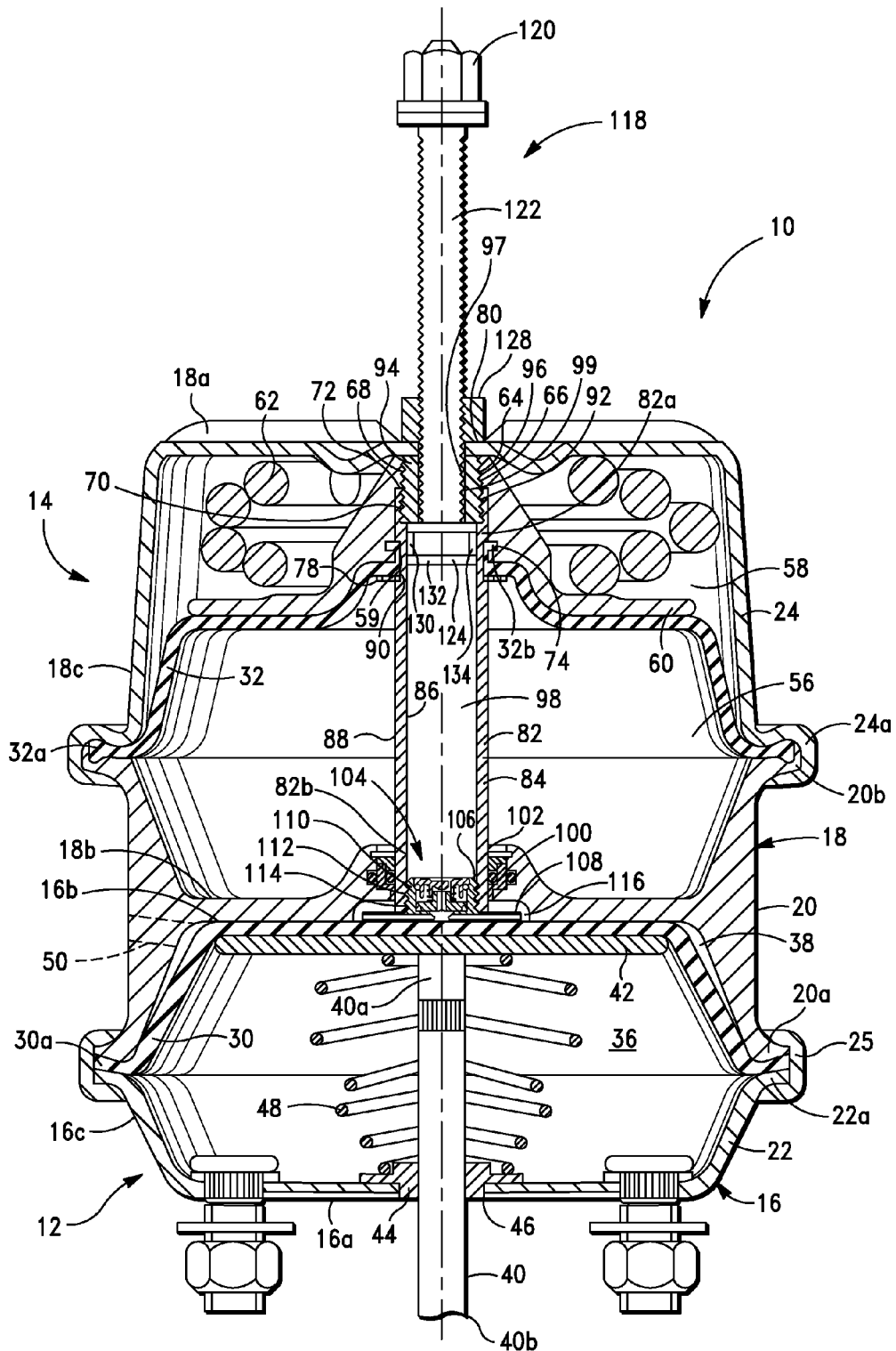
FIG. 1 is a cross-sectional view of a pneumatic brake actuator having spring and service brake actuators where a caging bolt is shown retracting a spring of the spring brake actuator.

FIGS. 1-4 show a tandem-type pneumatic brake actuator 10 comprising a service brake actuator 12 in combination with a spring brake actuator 14. The service brake actuator 12 applies and releases the service or operating brakes of a vehicle. The spring brake actuator 14 is used to apply the emergency or parking brakes of the vehicle.

The service brake actuator 12 includes a housing 16 having first and second end walls 16a and 16b and a side wall 16c that is joined with and extends between the end walls 16a and 16b. The spring brake actuator 14 includes a sealed housing 18 having first and second end walls 18a and 18b and a side wall 18c that is joined with and extends between the end walls 18a and 18b. The housings 16 and 18 are formed by an adapter housing 20 that is coupled with a service brake cover 22 and a spring brake cover 24. The adapter housing 20 and spring brake cover 22 have mating flanges 20a and 22a, respectively, that are clamped together with a clamp 25 to secure the service brake cover 22 to the adapter housing 20. The adapter housing 20 has another flange 20b that is clamped by a C-shaped rolled rim 24a of spring brake cover 24 to secure the spring brake cover 24 to the adapter housing 20. The adapter housing 20 defines a common dividing wall separating the service brake housing 16 from the spring brake housing 18 while forming a portion of each housing 16 and 18 such that the second end walls 16b and 18b are integral. It is within the scope of the invention for the adapter housing 20 to be replaced with discrete cover elements similar to the service brake cover 22 and the spring brake cover 24.

Movable members, which in this embodiment include elastomeric diaphragms 30 and 32, span the interior of the service and spring brake housings 16 and 18, respectively. Diaphragm 30 has a peripheral edge 30a that is sealingly clamped between the mating flanges 20a and 22a of the adapter housing 20 and service brake cover 22, respectively. Diaphragm 32 has a peripheral edge 32a that is sealingly clamped between the flange 20b of adapter housing 20 and the rolled rim 24a of spring brake cover 24. A piston-type brake actuator, which has a piston that spans the interior of a cylindrical spring brake housing instead of a diaphragm, is also within the scope of the present invention.

Referring to the service brake actuator 12, the diaphragm 30 fluidly divides the service brake actuator 12 into a pushrod chamber 36 and a service brake pressure chamber 38. A pushrod 40 has a first end 40a that is positioned within the pushrod chamber 36 and a second end 40b positioned outside of the service brake housing 16. A pressure plate 42 is joined to the first end 40a of the pushrod 40 and abuts diaphragm 30. The pushrod 40 extends from its first end 40a to its second end 40b through a bearing 44 disposed in an opening 46 in the service brake cover 22. A return spring 48 is positioned between the bearing 44 and the pressure plate 42 to aid in biasing the pressure plate 42 and pushrod 40 toward the second end wall 16b of the service brake housing 16. Although not shown, in an S-cam brake assembly, the end 40b of the pushrod 40 is coupled to a slack adjuster of an S-cam brake assembly whereby the reciprocation of the pushrod 40 relative to the service brake housing 16 results in the application and release of the service brakes.

The service brake pressure chamber 38 is fluidly connected to a source of pressurized air through an inlet port 50. As the operator of the vehicle applies the brake pedal, pressurized air is introduced into the service brake pressure chamber 38 through the inlet port 50 to reciprocate the pushrod 40. As the operator of the vehicle releases the brake pedal, the pressurized air is exhausted from the service brake pressure chamber 38 through the inlet port 50. The addition of pressurized air into the service brake pressure chamber 38 moves the diaphragm 30, pressure plate 42 and pushrod 40 away from the second end wall 16b toward the first end wall 16a to apply the service brakes.

Referring to the spring brake actuator 14, the diaphragm 32 fluidly divides the spring brake housing 18 into a spring brake pressure chamber 56 and spring chamber 58. The diaphragm extends from its peripheral edge 32a to an interior, radial edge 32b that surrounds an opening 59 in the diaphragm. The spring brake pressure chamber 56 is fluidly connected to a source of pressurized air through a port (not shown) that is substantially identical to port 50. Typically, the pressure chamber 56 is supplied by a pressurized air system that is physically distinct from the pressurized air system supplying the service brake actuator 12. The spring chamber 58 is sealed to protect the components therein from direct exposure to the atmosphere and common environmental contaminants.

A pressure plate 60 is positioned in the spring chamber 58 adjacent to the diaphragm 32. A large force compression spring 62 is placed between the pressure plate 60 and the spring brake cover 24. The pressure plate 60 includes an axial opening 64 surrounded by an interior surface 66 that includes a threaded portion 68, a non-threaded portion 70, and an actuator tube shoulder 72 between the two portions 68 and 70. An annular groove 74 that is formed in the non-threaded portion 70 receives the interior edge 32b of the diaphragm 32. A retaining ring 78 secures the diaphragm 32 to the pressure plate 60. It is within the scope of the invention for the actuator to not have retaining ring 78 such that the groove 74 and configuration of the interior edge 32b of the diaphragm 32 secures the diaphragm 32 to the pressure plate 60. There is an opening 80 in the spring brake cover 24 that is aligned with the opening 64 through pressure plate 60.

A hollow actuator tube 82 has a first end 82a that fits within the axial opening 64 and abuts the actuator tube shoulder 72 and a second end 82b which is positioned in the service brake pressure chamber 38. The actuator tube 82 has a side wall 84 with inner and outer surfaces 86 and 88, respectively. The outer surface 88 includes a recessed portion 90 that receives a portion of the interior edge 32b of the diaphragm 32 and the optional retaining ring 78. A portion of the outer surface 88 abuts the non-threaded portion 70 of the pressure plate 60. The inner surface 86 includes a threaded portion 92 that is aligned with the threaded portion 68 of the pressure plate 60.

An annular bearing or flange guide 94 has a threaded outer surface 96 that engages the threaded portion 92 of actuator tube 82 and the threaded portion 68 of pressure plate 60 thereby joining the bearing 94, actuator tube 82, and pressure plate 60. It is within the scope of the invention for the bearing 94 to be bonded to the actuator tube 82 and pressure plate 60 in addition to or instead of being joined with threads. For example, the bearing 94 can be welded to the actuator tube 82 and/or pressure plate 60.

The bearing 94 has a smooth inner surface 97 surrounding an opening 99. The bearing 94 and the pressure plate 60 define therein air passage ways or clearances (not shown) to allow air flow back and forth between the spring chamber 58 and the interior space 98 enclosed by the side wall 84 of the hollow actuator tube 82. Thus, spring chamber 58 is in fluid communication with the interior space 98 of the actuator tube 82.

The actuator tube 82 extends from its first end 82a, which is positioned in the spring chamber 58, through a bearing and seal assembly 100 disposed within an opening 102 formed in the adapter housing 20 to its second end 82b, which is positioned in the service brake pressure chamber 38. The bearing and seal assembly 100 are well known in the art and thus are not described in more detail herein.

A control valve 104, which is described in more detail below in connection with FIGS. 5A-D, is joined to and closes the second end 82b of the actuator tube 82 opposite the pressure plate 60 for regulating fluid flow between spring chamber 58 and service brake pressure chamber 38. The control valve 104 includes a valve body 106 having a transfer plate 108 that is joined to a cylindrical protrusion 110. The cylindrical protrusion 110 has a threaded side wall 112 that engages threads 114 on the inner surface 86 of the side wall 88 of the actuator tube 82. The protrusion 110 is at least partially positioned within the interior space 98 of the actuator tube 82. A seal is formed between the threaded side wall 112 of the control valve 104 and the side wall 88 of the actuator tube 82 to prevent fluid from flowing between the two. Seal structure, such as an o-ring seal, may be positioned between the side wall 112 of the control valve 104 and the side wall 88 of the actuator tube 82 to form the seal. Alternatively, or in addition to using seal structure, such as an o-ring seal, a liquid sealant may be applied to the threaded side wall 112 before the control valve 104 is threaded within the actuator tube 82. The liquid sealant would subsequently harden to form a seal between the control valve 104 and actuator tube 82. The transfer plate 108 is preferably sized to be received within a recess 116 in the adapter housing 20.

The brake actuator 10 further comprises a caging bolt assembly 118 comprising an adjustment nut 120 threaded onto and permanently affixed to one end of a caging bolt 122 which terminates at its other end in a caging bolt head 124. The caging bolt head 124 and a portion of the caging bolt 122 extending from the head 124 are positioned within the interior space 98 of the actuator tube 82. The caging bolt 122 extends through the opening 99 of the bearing 94 and through the opening 80 in the spring brake cover 24. The caging bolt 122 is threaded through a cap or collar 128, which is riveted and permanently affixed to the spring brake cover 24 in a substantially sealed manner so that air cannot pass through opening 80. Since the nut 120 and caging bolt head 124 are greater in diameter than the diameter of the opening 99 in bearing 94, the caging bolt 122 couples the pressure plate 60 to the spring brake cover 24 via the connection between the bearing 94 and pressure plate 60 and the connections between the caging bolt 122, collar 128, and spring brake cover 24.

The caging bolt head 124 preferably includes a bearing 130 positioned between opposing collars 132. The bearing 130 contacts the inner surface 86 of the actuator tube 82 to prevent the collars 132 and caging bolt 122 from contacting the inner surface 86 while helping to guide the reciprocal movement of the actuator tube 82 during the application and release of the emergency brakes. Axial slots 134 are formed in the face of the bearing 130 to form a fluid flow path around the bearing 130 so that the spring chamber 58 is in fluid communication with the entire interior space 98 enclosed by the actuator tube 82.

The caging bolt assembly 118 is operable to mechanically retract and hold the large force compression spring 62 in a compressed state (as shown in FIG. 1). By engaging the adjustment nut 120 with a wrench or socket and rotating the nut 120, it is possible to threadably withdraw the majority of the caging bolt 122 out of the spring brake housing 24 from the position shown in FIG. 4 to the position shown in FIG. 1. As the caging bolt 122 is withdrawn, the caging bolt head 124 contacts the bearing 94 at the upper end 82a of the actuator tube 82 to move the bearing 94, actuator tube 82, and pressure plate 60 toward the end wall 18a of the spring brake housing 18 thereby compressing the spring 62. Caging the large force compression spring 62 in this manner, as shown in FIG. 1, is well known and is typically utilized during assembly of the brake actuator 10 and/or for the mechanical release of the brakes in the case of a failure or absence of the compressed air system. When the brake actuator 10 is in active use on a moving vehicle, the caging bolt 122 is moved to the position shown in FIGS. 2-3.

Referring now to FIGS. 5A-5D, the control valve 104 includes valve body 106, and a seal 136, spring 138, and o-ring seal 140 positioned inside a channel 142 defined by an interior surface 144 of the valve body 106. The transfer plate 108 of the valve body 106 has upper and lower surfaces 146 and 148 joined by a side wall 150. The cylindrical protrusion 110 of the valve body 106 has upper and lower surfaces 152 and 154 joined by threaded side wall 112. The lower surface 154 of the protrusion 110 is joined to the upper surface 146 of the transfer plate 108. The channel 142 through the valve body 106 includes an upper cylindrical section 156 that is enclosed by the side wall 112 of protrusion 110, a lower vertical section 158 extending through the transfer plate 108 from upper surface 146 to lower surface 148, and a lower horizontal section 160 that extends through the transfer plate 108 between openings 162 and 164 in side wall 150.

Figure 5A:
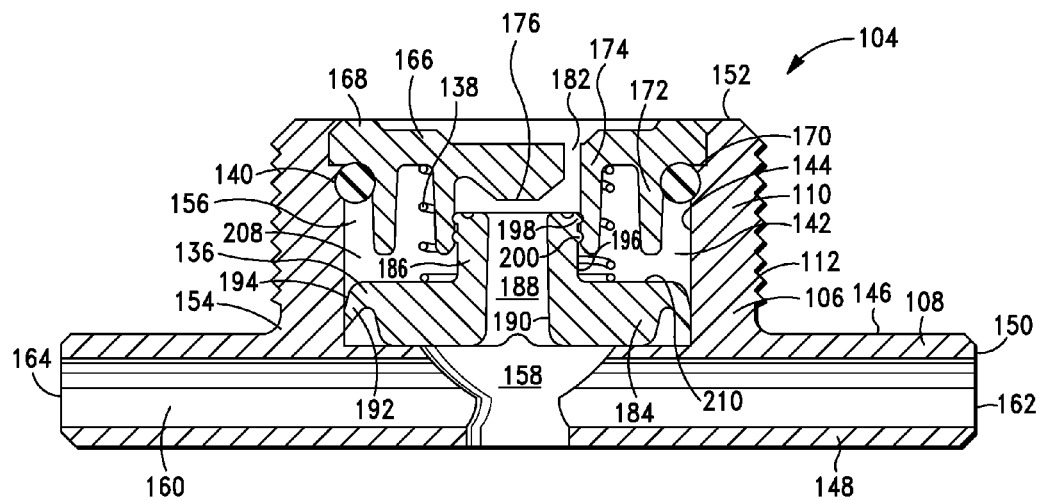
FIG. 5A is a cross-sectional view of a control valve that controls fluid flow between a spring chamber of the spring brake actuator and a pressure chamber of the service brake actuator of the brake actuator of FIG. 1 where the control valve is shown in an open position.

The valve body 106 also includes a retainer 166 that is positioned within the channel 142 for retaining seal 136 within the channel 142. The retainer 166 is preferably press fit into the channel 142. The retainer has a disk shaped upper section 168 that is supported by a ledge 170 formed in the interior surface 144. Concentric rings 172 and 174 that are integral with upper section 168 extend into channel 142. A plug 176 that is centered in ring 174 is integral with upper section 168 and extends into channel 142. Referring to FIG. 5C, there are three channels 178, 180, and 182 that are formed in and extend through the retainer 166. Each channel 178, 180, and 182 is positioned between ring 174 and plug 176, as best shown in FIG. 5A with respect to channel 182. The channels 178, 180, and 182 allow air to flow through the retainer 166. O-ring 140 is positioned between ring 172 and the interior surface 144 to form a seal and prevent air from flowing between the retainer 166 and interior surface 144.

Seal 136 is positioned in channel 142 between retainer 166 and the upper surface 146 of transfer plate 108. The seal 136 includes a disk shaped base 184 and a cylindrical protrusion 186 integral with and extending upward from the base 184. An opening 188 extends through the center of the seal 136 and is enclosed by an interior surface 190. A flange 192 extends outward from the base 184 of the seal 136 and includes a peripheral surface 194 that sealingly engages the interior surface 144 of the valve body 106. The protrusion 186 includes an outer surface 196 and a pair of rings 198 and 200 that are integral with and extend outward from surface 196. Rings 198 and 200 sealingly engage the ring 174 on retainer 166. Referring to FIG. 5D, the base 184 has a lower surface 202 with five radial grooves formed therein one of which is shown as 204. The grooves 204 extend from an outer peripheral edge 206 of base 184 to opening 188. The grooves 204 are designed to allow air to easily reach all portions of the base 184 and flange 192 of seal 136. It is within the scope of the invention for the seal 136 to have more or less than five grooves 204, including no grooves 204, and for the grooves 204 to be spiral shaped instead of radial. It is also within the scope of the invention for the seal 136 to have some structure besides grooves that allows air to easily reach all portions of the base 184 and flange 192.

A valve chamber 208 is enclosed by the seal 136 and valve body 106. Rings 198 and 200 and flange 192 on seal 136 are in sealing engagement with valve body 106 to prevent fluid from entering or exiting valve chamber 208. Spring 138 is positioned within valve chamber 208 between retainer 166 and seal 136. The spring 138 is positioned around ring 174 to retain it in place within the chamber 208. One end of the spring 138 abuts retainer 166 and the other end of the spring 138 abuts an upper surface 210 of the base 184 of seal 136. The valve chamber 208 is not in fluid communication with spring chamber 58 or service brake pressure chamber 38.

Figure 5B:
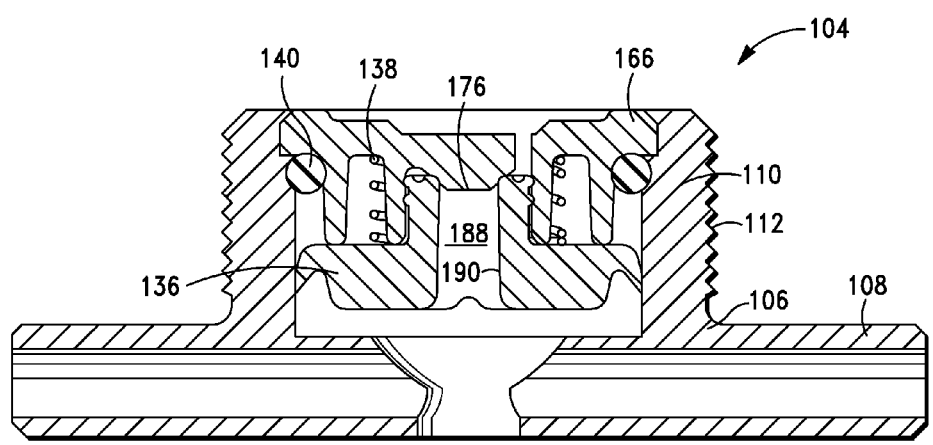
FIG. 5B is a cross-sectional view of the control valve of FIG. 5A showing the control valve in a closed position.
Figure 5C:
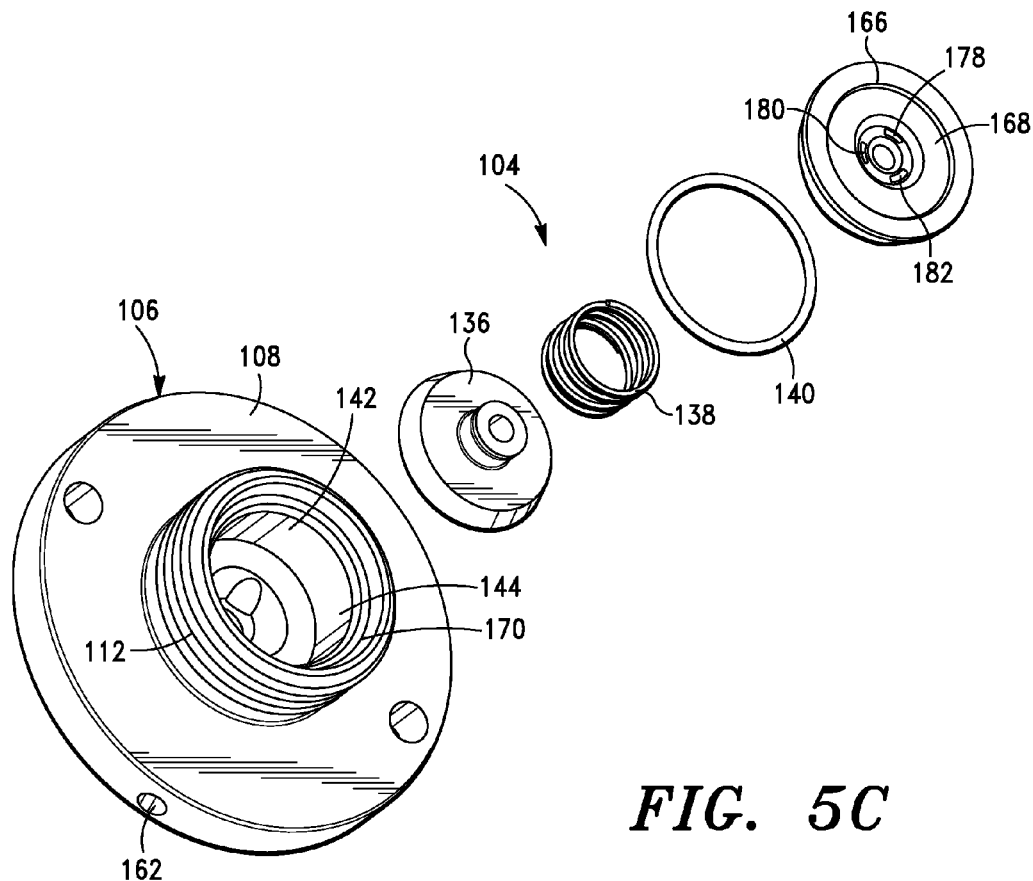
FIG. 5C is an exploded perspective view of the control valve of FIG. 5A.
Figure 5D:
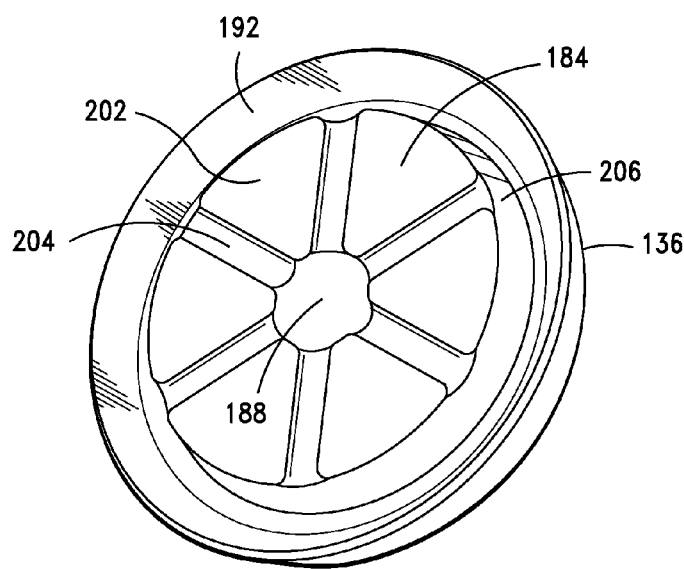
FIG. 5D is a perspective view of a bottom of a seal of the control valve of FIG. 5A.

The seal 136 is moveable between an open position, as shown in FIG. 5A in which fluid can flow between the spring chamber 58 and the service brake pressure chamber 38 through the channel 142 of the valve body 106 and the opening 188 in the seal 136, and a closed position, as shown in FIG. 5B in which fluid is blocked from flowing between the spring chamber 58 and service brake pressure chamber 38. When the seal 136 is in its closed position, the opening 188 in seal 136 receives the plug 176 on retainer 166 and the interior surface 190 sealingly engages the plug 176 to prevent fluid from flowing between the two. The seal 136 is biased to its open position by spring 138. The seal 136 moves from its open position to its closed position when the pressure in service brake pressure chamber 38 increases to a threshold level at which the force exerted on the lower surface 202 of seal 136 due to the pressure in pressure chamber 38 acting on the surface area of the lower surface 202 is greater than the net force exerted on the upper surface 210 of seal 136 due to the pressure in valve chamber 208 acting on the surface area of the upper surface 210 and the biasing force of spring 138. When the seal 136 is in its closed position, pressure chamber 38 can be pressurized to activate the service brake actuator 12 without undesirably pressurizing the spring chamber 58. Spring 138 is optional such that the seal 136 moves to its closed position when the force exerted on the lower surface 202 of seal due to the pressure in pressure chamber 38 exceeds the force exerted on the upper surface 210 of seal 136 due to the pressure in valve chamber 208.

The configuration of the channel 142 within valve body 106 and lower surface 202 of seal 136 allow fluid from the pressure chamber 38 to flow under the seal 136 and cause it to move to its closed position when the pressure in pressure chamber 38 reaches a threshold level as described above. Specifically, the diameter of the lower vertical section 158 of the channel increases moving upward from the lower surface 148 to the upper surface 146 of transfer plate 108 so that air flowing through the section 158 reaches a larger portion of the lower surface 202 of seal 136. Referring to FIG. 5D, the grooves 204 on the lower surface 202 of seal 136 direct air contacting the lower surface 202 toward the outer peripheral edge 206 of the base 184 and in the gap between the outer peripheral edge 206 and the flange 192. Thus, when air flows into pressure chamber 38 through inlet port 50 the configuration of the seal 136 and valve body 106 allows that air to contact the entire lower surface 202 of the seal 136 for raising the seal 136 to its closed position when the pressure in the pressure chamber 38 increases to a threshold level that exerts a force on the lower surface 202 of the seal 136 that is greater than the net force exerted on the upper surface 210 of seal 136 due to the pressure in valve chamber 208 and the biasing force of spring 138.

Because the valve chamber 208 is not in fluid communication with service brake pressure chamber 38, movement of the seal 136 is not dependent on the rate of flow of fluid between the spring chamber 58 and pressure chamber 38, as is the case with conventional pneumatic brake actuator two way control valves. Further, movement of the seal 136 is not dependent on the pressure differential between the spring chamber 58 and service brake pressure chamber 38. The control valve 104 is a pilot operated valve with the pilot pressure being the pressure in the service brake pressure chamber 38. Therefore, seal 136 will close when the pressure in service brake pressure chamber 38 reaches a threshold level no matter how slowly the pressure in pressure chamber 38 rises. Accordingly, movement of the seal 136 is solely dependent on the pressure differential between the service brake pressure chamber 38 and the valve chamber 208 and the biasing force exerted on the seal 136 by spring 138. When the pressure differential causes a net force to be exerted on the lower surface 202 of seal 136 that is greater than the biasing force of spring 138, the seal 136 moves to its closed position.

While seal 136 and valve body 106 are preferably shaped as described above and shown in FIGS. 5A-D, it is within the scope of the invention for the seal 136 and valve body 106 to have a different construction. For example, it is within the scope of the invention for the seal 136 to have any type of first sealing surface instead of surface 190 that engages the valve body 106 when the seal is in its closed position, and any type of second and third sealing surfaces instead of surface 194 and ring 198 that engage the valve body 106 to seal the valve chamber 208 from the spring chamber 58 and the service brake pressure chamber 38.

Nine alternative embodiments of control valves 300, 400, 500, 600, 700, 800, 900, 1000, and 1100 are shown in FIGS. 6A-14C and described below. Each of these alternative embodiments can be used in brake actuator 10 in place of control valve 104 or in a piston type spring brake actuator. When used in brake actuator 10, each of the control valves 300, 400, 500, 600, 700, 800, 900, 1000, and 1100 preferably threads within actuator tube 82 and forms a seal with actuator tube 82 in the same manner as described above with respect to control valve 104. The specific embodiments of control valves described in this application are exemplary only as other types of control valves fall within the scope of the present invention.

Figure 6A:
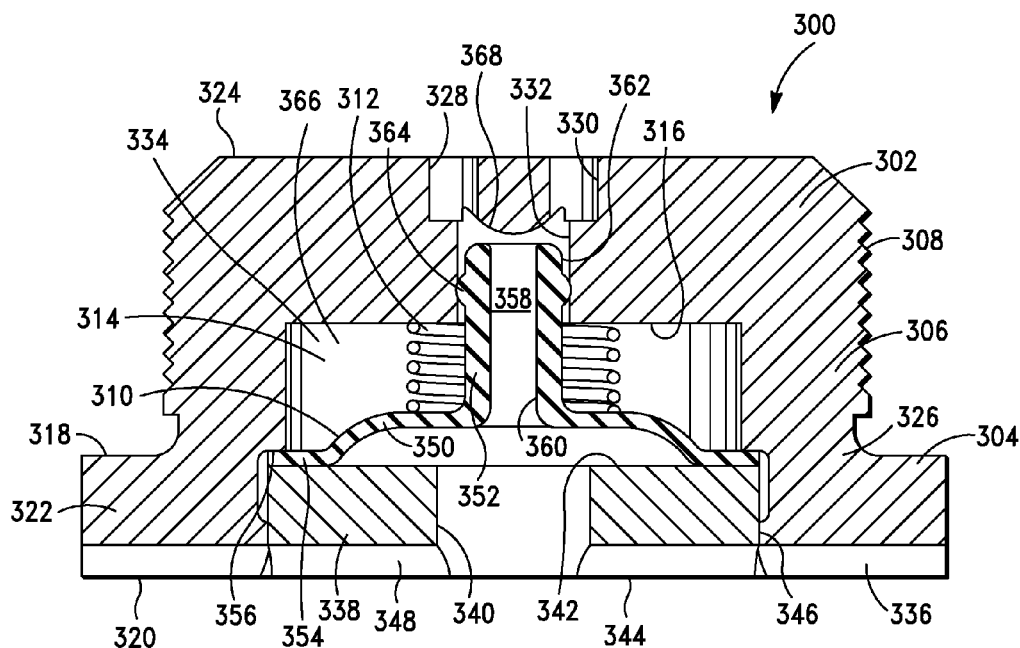
FIG. 6A is a cross-sectional view of a first alternative embodiment of control valve shown in an open position.
Figure 6B:
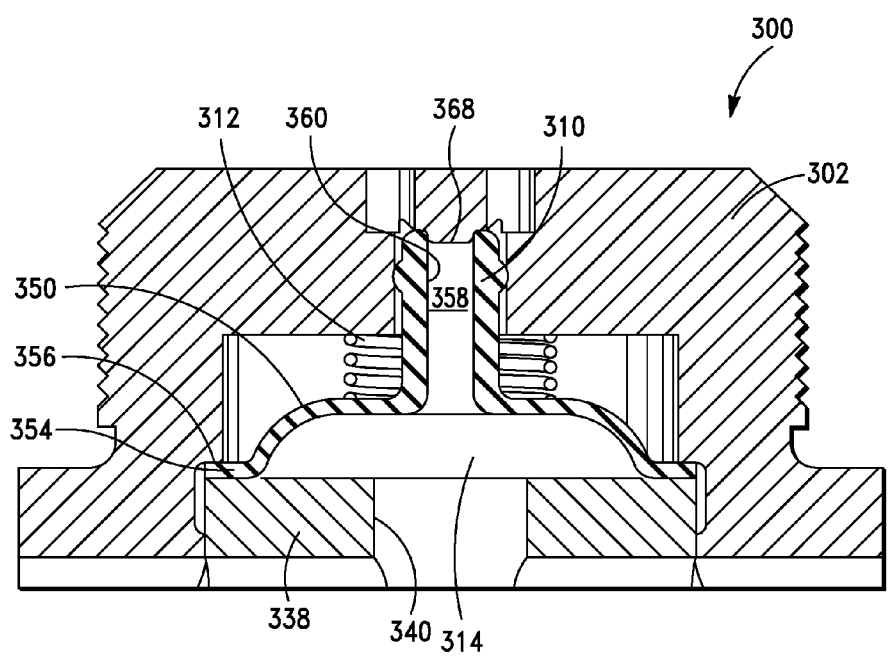
FIG. 6B is a cross-sectional view of the control valve of FIG. 6A shown in a closed position.
Figure 6C:
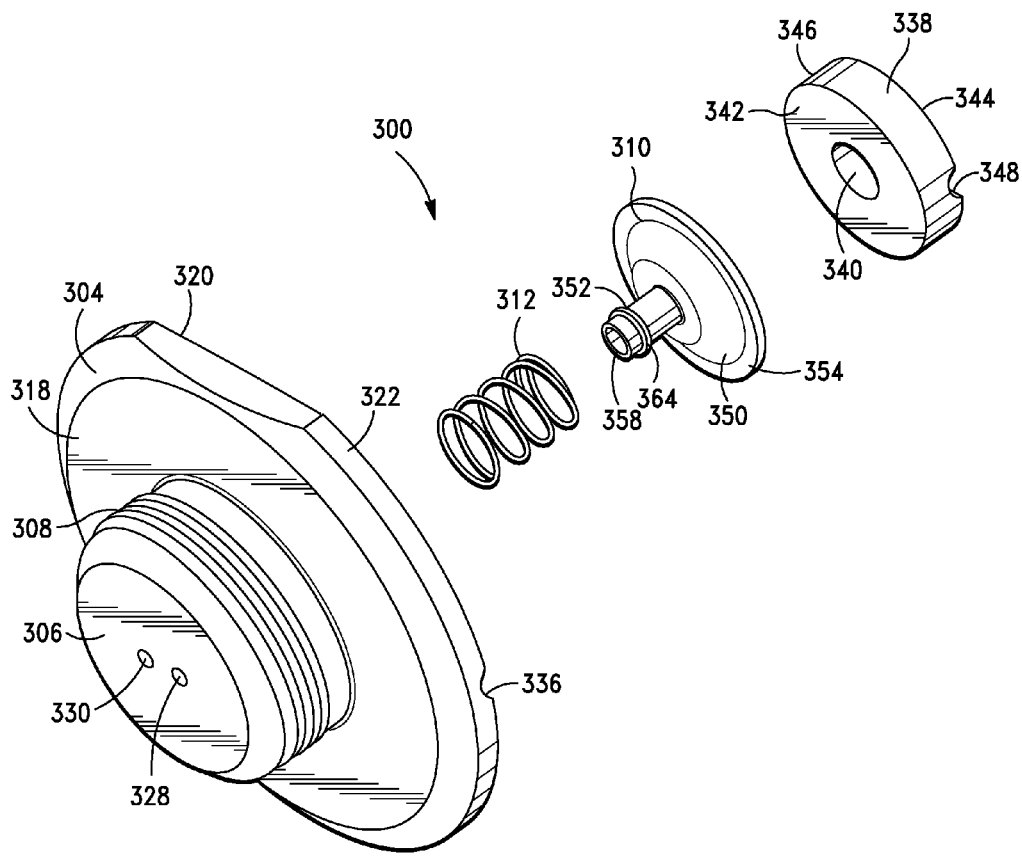
FIG. 6C is an exploded perspective view of the control valve of FIG. 6A.

Referring to FIGS. 6A-6C, an alternative embodiment of control valve is shown generally as 300. Control valve 300 includes a valve body 302 having a transfer plate 304 that is joined to a cylindrical protrusion 306. The cylindrical protrusion 306 has a threaded side wall 308 that engages threads 114 on actuator tube 82 (FIG. 1). A diaphragm seal 310 and spring 312 are positioned inside a channel 314 defined by an interior surface 316 of the valve body 302. The transfer plate 304 of the valve body 302 has upper and lower surfaces 318 and 320 joined by a side wall 322. The cylindrical protrusion 306 of the valve body 302 has upper and lower surfaces 324 and 326 joined by threaded side wall 308. The lower surface 326 of the protrusion 306 is joined to the upper surface 324 of the transfer plate 304. The channel 314 through the valve body 302 includes a pair of holes 328 and 330 through upper surface 324, an upper cylindrical section 332 in fluid communication with the holes 328 and 330, and a lower cylindrical section 334. A groove 336 is also formed in the lower surface 320 of the transfer plate 304.

The valve body 302 includes a retainer 338 that is positioned within the channel 314 for retaining seal 310 within the channel 314. The retainer 338 is preferably press fit into the channel 314. The retainer 338 is cylindrical and includes a hole 340 through its center. The retainer has upper and lower surfaces 342 and 344 and a side wall 346. A groove 348 is formed in lower surface 344 that is aligned with groove 336 in transfer plate 304.

Seal 310 is positioned in channel 314 between retainer 338 and the upper surface 324 of protrusion 306. The seal 310 includes a diaphragm 350 and a cylindrical protrusion 352 extending upward from the diaphragm 350. A flange 354 extends from the peripheral edge of the diaphragm 350. The flange 354 is clamped and sealed between the upper surface 342 of retainer 338 and a ledge 356 of interior surface 316. An opening 358 extends through the center of the seal 310 and is enclosed by an interior surface 360. The protrusion 352 includes an outer surface 362 and a ring 364 that is integral with and extends outward from surface 362. Ring 364 sealingly engages a portion of the interior surface 316 of valve body 302.

A valve chamber 366 is enclosed by the seal 310 and valve body 302. Ring 364 and flange 354 on seal 310 are in sealing engagement with valve body 302 to prevent fluid from entering or exiting valve chamber 366. Spring 312 is positioned within valve chamber 366 between seal 310 and a portion of interior surface 316. One end of the spring 312 abuts interior surface 316 and the other end of the spring 312 abuts the diaphragm 350 of seal 310. The valve chamber 366 is not in fluid communication with spring chamber 58 or service brake pressure chamber 38.

The seal 310 moves between an open position, as shown in FIG. 6A in which fluid can flow between the spring chamber 58 and the service brake pressure chamber 38 (FIG. 1) through the channel 314 of the valve body 302, the opening 358 in the seal 310, and the hole 340 in retainer 338, and a closed position, as shown in FIG. 6B in which fluid is blocked from flowing between the spring chamber 58 and service brake pressure chamber 38. As the seal 310 moves between its open and closed positions, the diaphragm 350 of seal flexes while the flange 354 remains stationary and clamped between retainer 338 and ledge 356. Preferably, the seal 310 is made from a flexible, resilient material capable of flexing as shown in FIGS. 6A and 6B. When the seal 310 is in its closed position, the opening 358 in seal 310 receives a plug 368 on valve body 302 and the interior surface 360 sealingly engages the plug 368 to prevent fluid from flowing between the two. The seal 310 is biased to its open position by spring 312. As described above in connection with control valve 104, the seal 310 moves from its open position to its closed position when the pressure differential between the service brake pressure chamber 38 and valve chamber 366 causes a net force to be exerted on the lower surface of seal 310 that is greater than the force exerted on the seal 310 by spring 312.

Figure 7A:
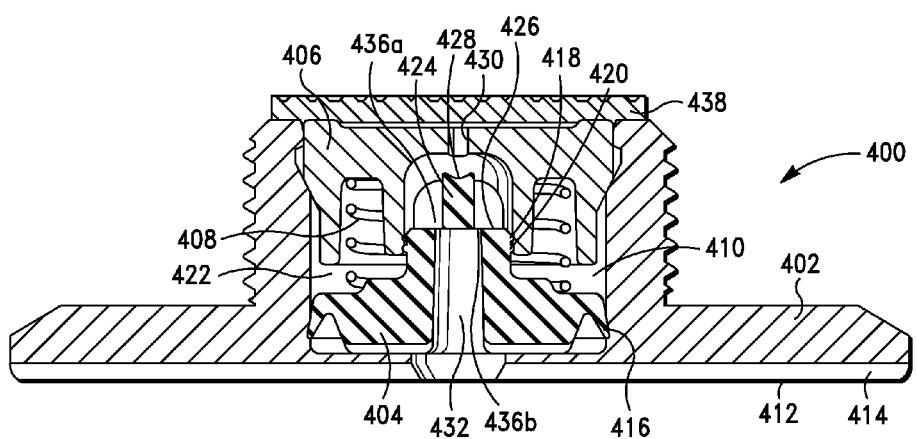
FIG. 7A is a cross-sectional view of a second alternative embodiment of control valve shown in an open position.
Figure 7B:
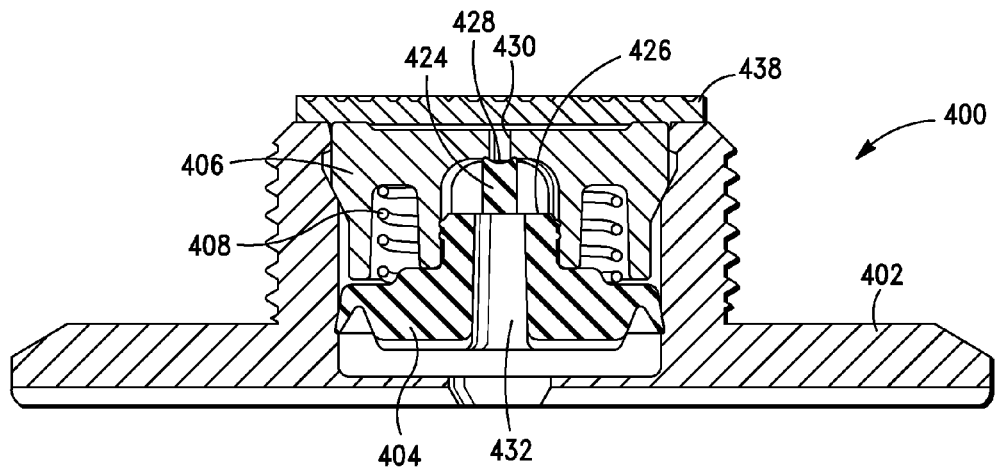
FIG. 7B is a cross-sectional view of the control valve of FIG. 7A shown in a closed position.
Figure 7C:
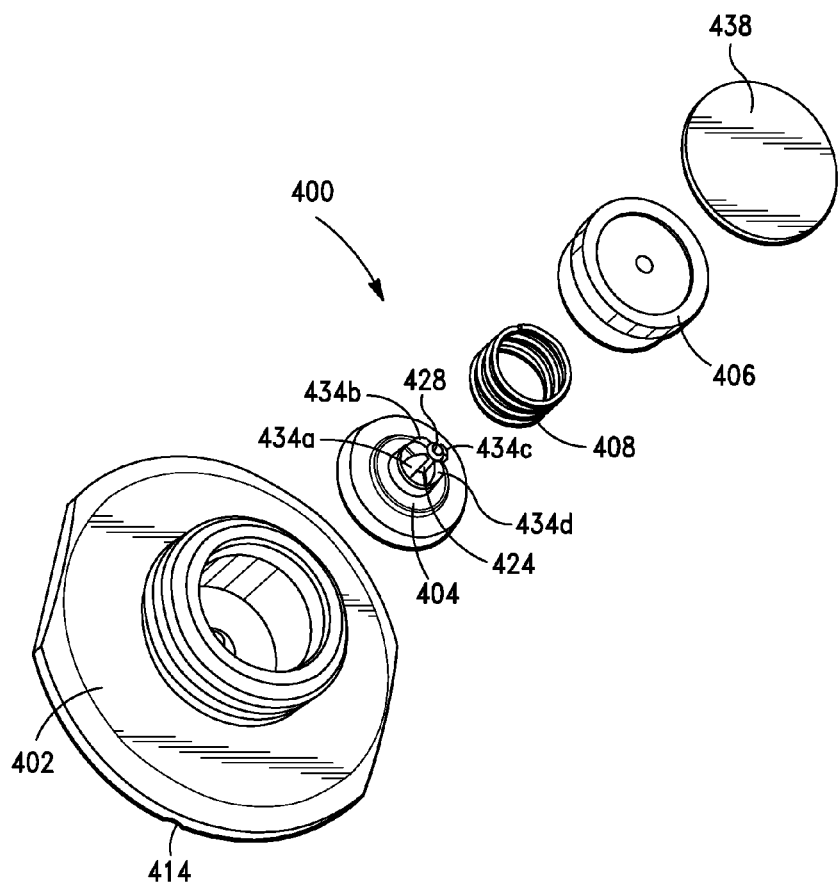
FIG. 7C is an exploded perspective view of the control valve of FIG. 7A.

Another alternative embodiment of control valve 400 is shown in FIGS. 7A-7C. Control valve 400 is similar to control valve 104. Accordingly, only the major differences are discussed herein. Control valve 400 has a valve body 402, and a seal 404, retainer 406, and spring 408 positioned within a channel 410 in the valve body 402. Valve body 402 has a bottom surface 412 that is slightly different than the valve body 106 of control valve 104. Bottom surface 412 has a groove 414 formed therein for enhancing fluid flow to seal 404. Seal 404 has a flange 416 and rings 418 and 420 that sealingly engage valve body 402 to create a valve chamber 422 containing spring 408 that is sealed from spring chamber 58 and pressure chamber 38 (FIG. 1).

The main difference between control valve 400 and control valve 104 is that the seal 404 of control valve 400 has a cylinder 424 extending upward from an upper surface 426 of the seal 404. The cylinder 424 includes an upper sealing surface 428 that engages retainer 406 and blocks an opening 430 in the retainer 406 when the seal 404 is in its closed position, as shown in FIG. 7B. The seal 404 has an opening 432 that is in fluid communication with opening 430 when the seal 404 is in its open position shown in FIG. 7A. The seal 404 also includes four quarter circular shaped protrusions 434a, 434b, 434c, and 434d (FIG. 7C) each joined to and extending between the upper surface 426 and cylinder 424. There are openings, two of which are shown as 436a and 436b in FIG. 7A, between adjacent protrusions 434a, 434b, 434c, and 434d that are in fluid communication with opening 432.

A filter 438 is securely attached on the top surface of the valve body 402. The filter 438 is preferably made from a synthetic, polymeric or other type of filter material and may be attached to the valve body 402 with a pressure sensitive adhesive backing. Preferably, the filter 438 is a porous and gas permeable polymeric membrane having hydrophobic and oleophobic properties and a pore size chosen based on the size of debris passing through the filter 438. One acceptable filter 438 comprises a treated, expanded polytetrafluoroethylene (PTFE) having a pore size of one micron, available from W. L. Gore and Associates and sold under the brand name Gore-Tex®. Alternatively, filter 438 may be constructed from a synthetic felt having a pore size of approximately 50 microns. Other types of filters are also within the scope of the present invention. Further, filter 438 may be attached to the top of any of the control valves shown in FIGS. 5A-13C.

Figure 8A:
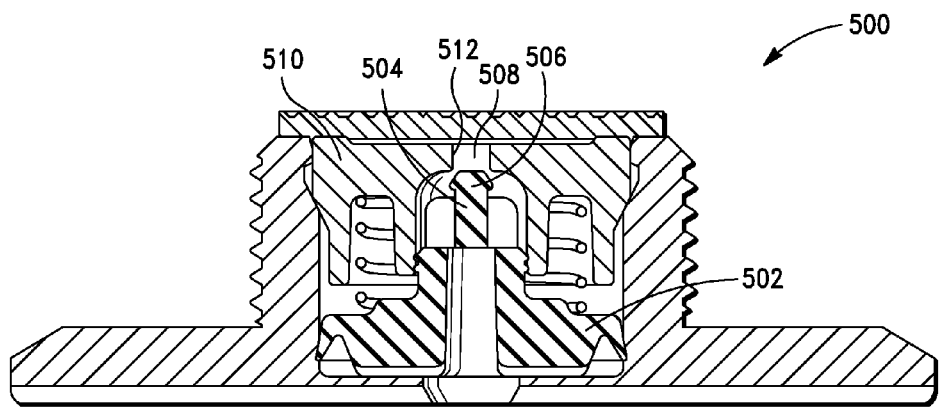
FIG. 8A is a cross-sectional view of a third alternative embodiment of control valve shown in an open position.
Figure 8B:
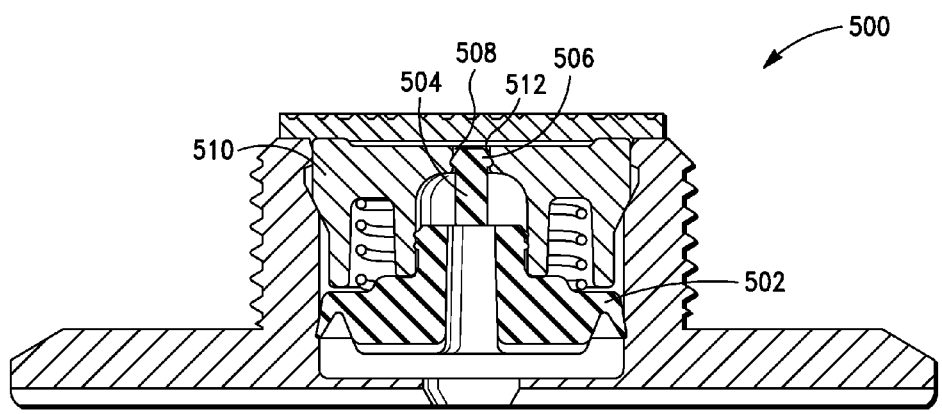
FIG. 8B is a cross-sectional view of the control valve of FIG. 8A shown in a closed position.

Referring to FIGS. 8A-8B, an alternative embodiment of control valve is shown generally as 500. Control valve 500 is substantially identical to control valve 400 shown in FIGS. 7A-7C. Accordingly, only the differences between the two are discussed in detail herein. Control valve 500 includes a seal 502 with a cylinder 504 extending upward from an upper surface of the seal 502. An end of the cylinder 504 has a mushroom shaped head 506 that is received by an opening 508 in retainer 510 when the seal 502 is in its closed position as shown in FIG. 8B. A peripheral edge of the head 506 sealingly engages a surface 512 of retainer 510 surrounding opening 508 when the seal 502 is in its closed position. Seal 502 differs from seal 404 of control valve 400 because a portion of seal 502 is received by the opening 508 in the retainer 510 when in its closed position while no portion of seal 404 is received by the opening 430 in retainer 406 when in its closed position.

Figure 9A:
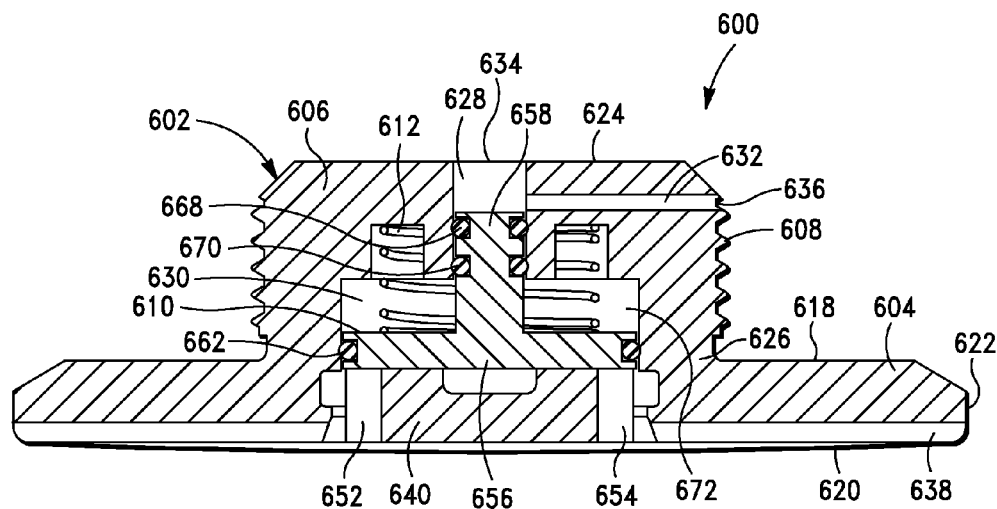
FIG. 9A is a cross-sectional view of a fourth alternative embodiment of control valve shown in an open position.
Figure 9B:
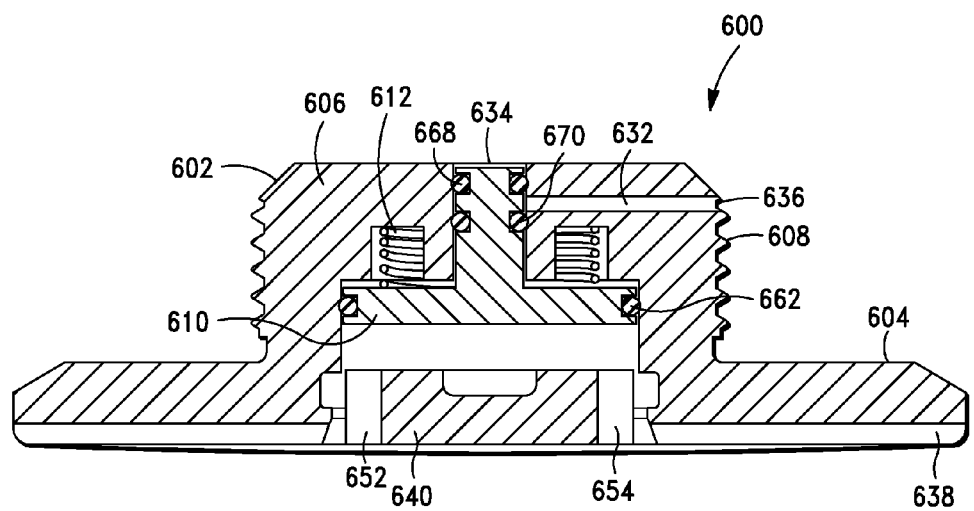
FIG. 9B is a cross-sectional view of the control valve of FIG. 9A shown in a closed position.
Figure 9C:
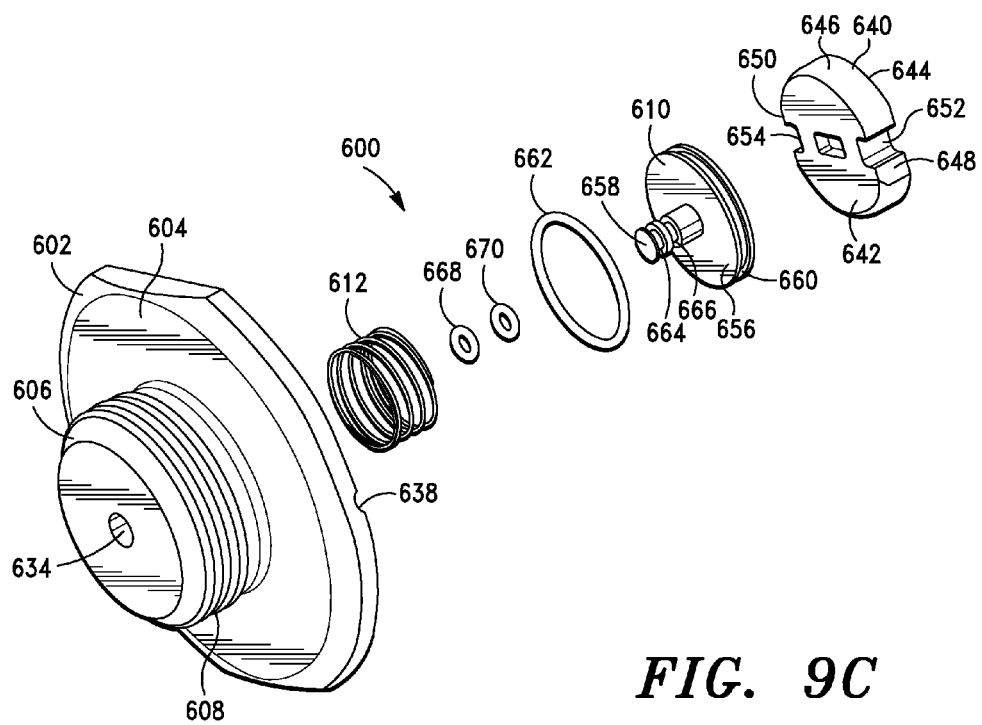
FIG. 9C is an exploded perspective view of the control valve of FIG. 9A.

An alternative embodiment of valve 600 is shown in FIGS. 9A-9C. Control valve 600 includes a valve body 602 having a transfer plate 604 that is joined to a cylindrical protrusion 606. The cylindrical protrusion 606 has a threaded side wall 608 that engages threads 114 on actuator tube 82 (FIG. 1). A seal, or piston, 610 and spring 612 are positioned inside a channel 614 defined by an interior surface 616 of the valve body 602. The transfer plate 604 of the valve body 602 has upper and lower surfaces 618 and 620 joined by a side wall 622. The cylindrical protrusion 606 of the valve body 602 has upper and lower surfaces 624 and 626 joined by threaded side wall 608. The lower surface 626 of the protrusion 606 is joined to the upper surface 618 of the transfer plate 604. The channel 614 through the valve body 602 includes an upper cylindrical section 628, a lower cylindrical section 630, and a horizontal passage 632 through the side wall 608 of the protrusion 606. The channel 614 includes an inlet 634 in the upper surface 624 of protrusion 606 and an outlet 636 in side wall 608. A groove 638 is formed in the lower surface 620 of the transfer plate 604.

The valve body 602 includes a retainer 640 that is positioned within the channel 614 for retaining seal 610 within the channel 614. The retainer 640 is preferably press fit into the lower section 630 of the channel 614 to retain seal 610 therein. As shown in FIG. 9C, the retainer 640 is circular having upper and lower surfaces 642 and 644 and a side wall 646. Side wall 646 includes two flat edges 648 and 650 formed at opposing sides of the side wall 646. Slots 652 and 654 are formed in the side wall 646 at edges 648 and 650, respectively. As shown in FIG. 9A, the slots 652 and 654 are aligned with the groove 638 in the bottom surface 620 of valve body 602 for providing a continuous flow passage from the bottom surface 620 of valve body 602 through retainer 640 to seal 610. The lower surface 644 of the retainer 640 is flat and flush with the bottom surface 620 of the transfer plate 604.

Seal 610 is positioned in channel 614 between retainer 640 and the upper surface 624 of protrusion 606. The seal 610 includes a disk shaped base 656 and a cylindrical protrusion 658 extending upward from base 656. The base 656 is positioned in the lower section 630 of channel 614, and the protrusion 658 extends upward into the upper section 628 of channel 614. Referring to FIG. 9C, a groove 660 is formed in base 656 for receiving an o-ring seal 662, and grooves 664 and 666 are formed in protrusion 658 for receiving o-ring seals 668 and 670, respectively. Seal 662 sealingly engages a portion of interior surface 616 surrounding lower section 630 of channel 614, and seals 668 and 670 sealingly engage a portion of interior surface 616 surrounding upper section 628 of channel 614. The seal 610 is preferably made from a rigid or semi-rigid material.

A valve chamber 672 is enclosed by the seal 610 and valve body 602. Seals 662, 668, and 670 are in sealing engagement with valve body 602 to prevent fluid from entering or exiting valve chamber 672. Spring 612 is positioned within valve chamber 672 between seal 610 and valve body 602. One end of the spring 612 abuts interior surface 616 and the other end of the spring 612 abuts the base 656 of seal 610. The valve chamber 672 is not in fluid communication with spring chamber 58 or service brake pressure chamber 38 (FIG. 1).

The seal 610 moves between an open position, as shown in FIG. 9A in which fluid can flow between the spring chamber 58 and the service brake pressure chamber 38, and a closed position, as shown in FIG. 9B in which fluid is blocked from flowing between the spring chamber 58 and service brake pressure chamber 38. When actuator tube 82, shown in FIG. 1, is used with control valve 600, the actuator tube 82 is preferably modified to have an opening (not shown) through its side wall 84 that is aligned with the outlet 636 in the side wall 608 of protrusion 606. The opening (not shown) in the actuator tube 82 is in fluid communication with the service brake pressure chamber 38. When the seal 610 is in its open position, fluid can flow from spring chamber 58 to service brake pressure chamber 38 through inlet 634, horizontal channel 632, outlet 636 and the opening (not shown) in actuator tube 82. When the seal 610 is in its closed position, seal 668 prevents fluid from flowing between the spring chamber 58 and service brake pressure chamber 38. The seal 610 is biased to its open position by spring 612. As described above in connection with control valve 104, the seal 610 moves from its open position to its closed position when the pressure differential between the service brake pressure chamber 38 and valve chamber 672 causes a net force to be exerted on the lower surface of seal 610 that is greater than the force exerted on the seal 610 by spring 612.

Figure 10:
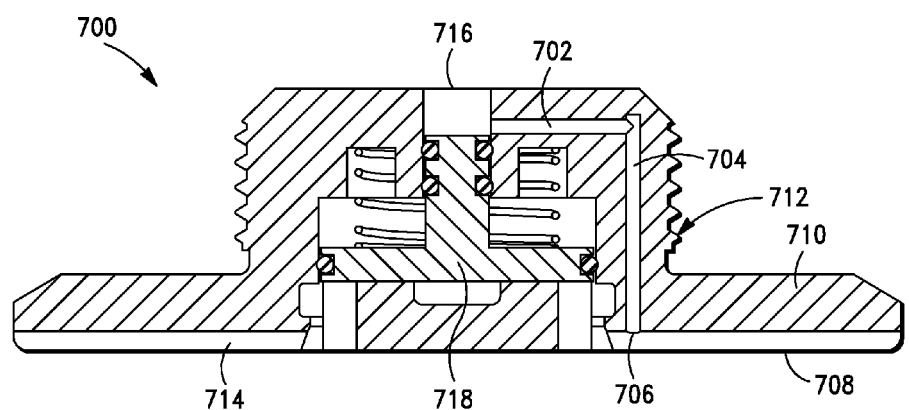
FIG. 10 is a cross-sectional view of a fifth alternative embodiment of control valve shown in an open position.

Referring to FIG. 10, an alternative embodiment of control valve is shown as 700. Control valve 700 is substantially similar to control valve 600. Accordingly, control valve 700 is only described herein to the extent that it differs from control valve 600. While control valve 600 has a horizontal channel 632 with an outlet 636 in the side wall 608 of protrusion 606, control valve 700 has a horizontal channel 702 that is in fluid communication with a vertical channel 704 that has an outlet 706 in the lower surface 708 of the transfer plate 710 of the valve body 712. The outlet 706 is positioned within a groove 714 in the lower surface 708. When the valve 700 is in the open position shown in FIG. 10, fluid can flow from spring chamber 58 to service brake pressure chamber 38 (FIG. 1) through an inlet 716, horizontal channel 702, vertical channel 704, and outlet 706. The seal, or piston, 718 of the valve 700 moves upward into its closed position in the same manner as the seal 610 of valve 600 to block fluid from flowing through channel 702.

Figure 11A:
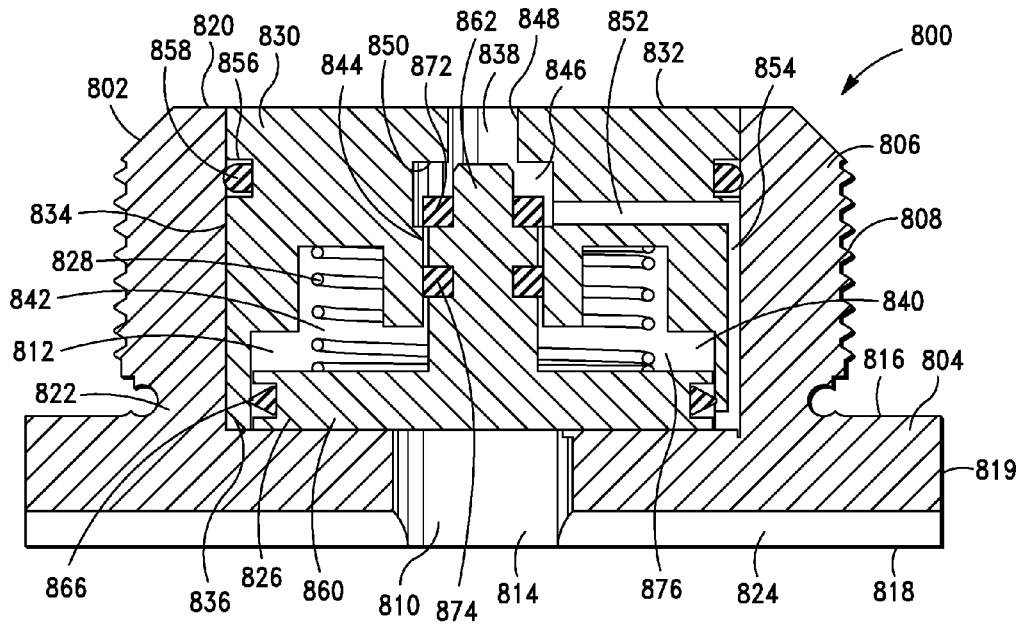
FIG. 11A is a cross-sectional view of a sixth alternative embodiment of control valve shown in an open position.
Figure 11B:
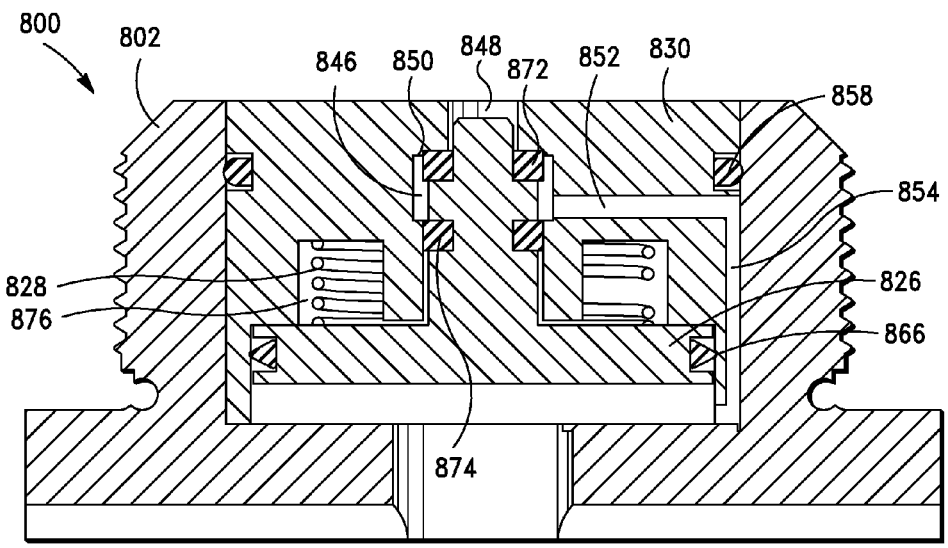
FIG. 11B is a cross-sectional view of the control valve of FIG. 11A shown in a closed position.
Figure 11C:
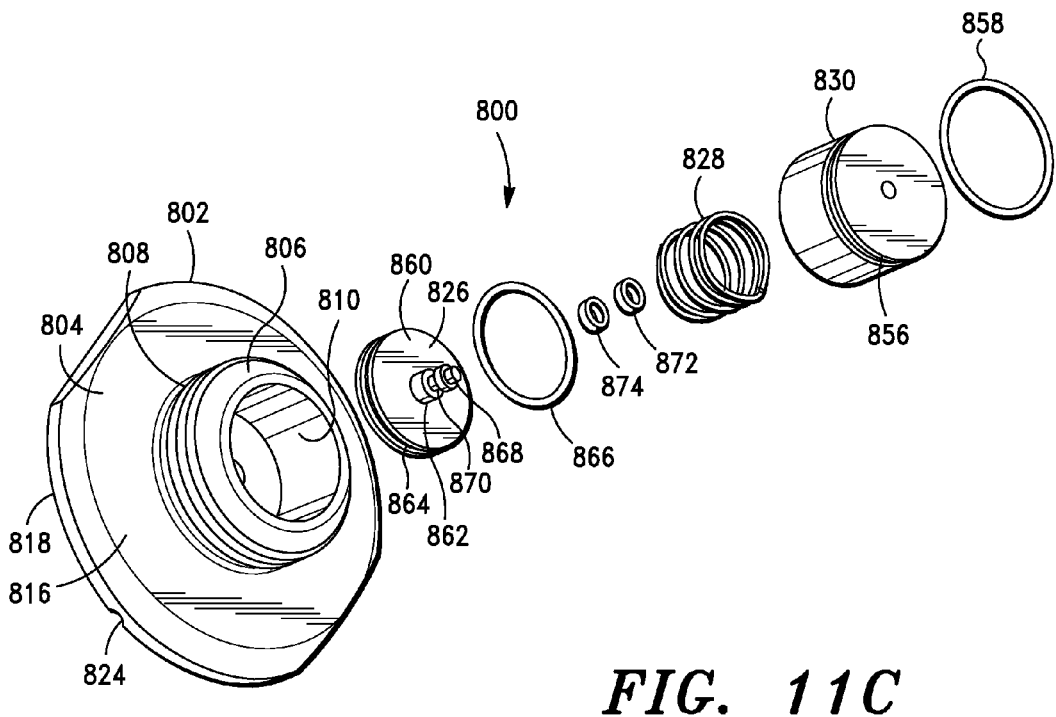
FIG. 11C is an exploded perspective view of the control valve of FIG. 11A.

FIGS. 11A-11C show another alternative embodiment of control valve 800 in accordance with the present invention. Control valve 800 has a valve body 802 with a transfer plate 804 that is joined to a cylindrical protrusion 806. The protrusion 806 has a threaded side wall 808 that engages threads on actuator tube 82. The valve body 802 defines a channel 810 including an upper cylindrical section 812 surrounded by side wall 808 and a lower cylindrical section 814 positioned within transfer plate 804. The transfer plate 804 has upper and lower surfaces 816 and 818, respectively, and a side wall 819, and the protrusion 806 has upper and lower surfaces 820 and 822, respectively. The upper surface 816 of transfer plate 804 is joined to the lower surface 822 of protrusion 806. A groove 824 is formed in the lower surface 818 of transfer plate 804.

A seal, or piston, 826, spring 828, and retainer 830 are positioned within the upper section 812 of channel 810. The retainer 830 is generally cylindrical and has an upper surface 832, a side wall 834, and a lower edge 836. The retainer 830 has a cavity 838 with a lower cylindrical section 840 adjacent lower edge 836, an annular section 842 for retaining spring 828, and first, second, and third upper cylindrical sections 844, 846, and 848. Second cylindrical section 846 has a greater diameter than third cylindrical section 848 such that an annular surface 850 is positioned between the two sections. A horizontal channel 852 extends from the second cylindrical section 846 to a vertical groove 854 in the side wall 834 of the retainer 830. There is also a groove 856 formed in the side wall 834 of retainer 830 for receiving a seal 858 that prevents fluid from flowing between retainer 830 and valve body 802.

The seal 826 has a disk shaped base 860 and a cylindrical protrusion 862 extending upward from the base 860. Referring to FIG. 11C, a groove 864 is formed in base 860 for receiving a delta seal 866, and a pair of grooves 868 and 870 are formed in protrusion 862 for receiving square ring seals 872 and 874, respectively. The base 860 is positioned in the lower cylindrical section 840 of the cavity 838 within retainer 830. The protrusion 862 extends upward through the first and second cylindrical sections 844 and 846 of the cavity 838 within retainer 830. The seal 826 is preferably made from a rigid or semi-rigid material.

A valve chamber 876 is enclosed by the seal 826 and retainer 830. Seals 866 and 874 are in sealing engagement with the retainer 830 to prevent fluid from entering or exiting the valve chamber 876. The spring 828 is positioned within the valve chamber 876 between a portion of the retainer 830 and the seal 826 for biasing the seal 826 to its open position shown in FIG. 11A.

The seal 826 is moveable between its open position shown in FIG. 11A and the closed position shown in FIG. 11B. In its open position, fluid can flow between the spring chamber 58 and the service brake pressure chamber 38 (FIG. 1) through the second and third upper sections 846 and 848 of the cavity 838 in retainer 830, the horizontal channel 852, vertical groove 854, the space between seal 826 and the upper surface 816 of transfer plate 804, and the lower cylindrical section 814 of channel 810. When the seal 826 is in its closed position, as shown in FIG. 11B, the square ring seal 872 engages the annular surface 850 to prevent fluid from flowing between the second and third upper sections 846 and 848 thereby preventing fluid from flowing between the spring chamber 58 and the service brake pressure chamber 38. As described above in connection with control valve 104, the seal 826 moves from its open position to its closed position when the pressure differential between the service brake pressure chamber 38 and valve chamber 876 causes a net force to be exerted on the lower surface of seal 826 that is greater than the force exerted on the seal 826 by spring 828.

Figure 12A:
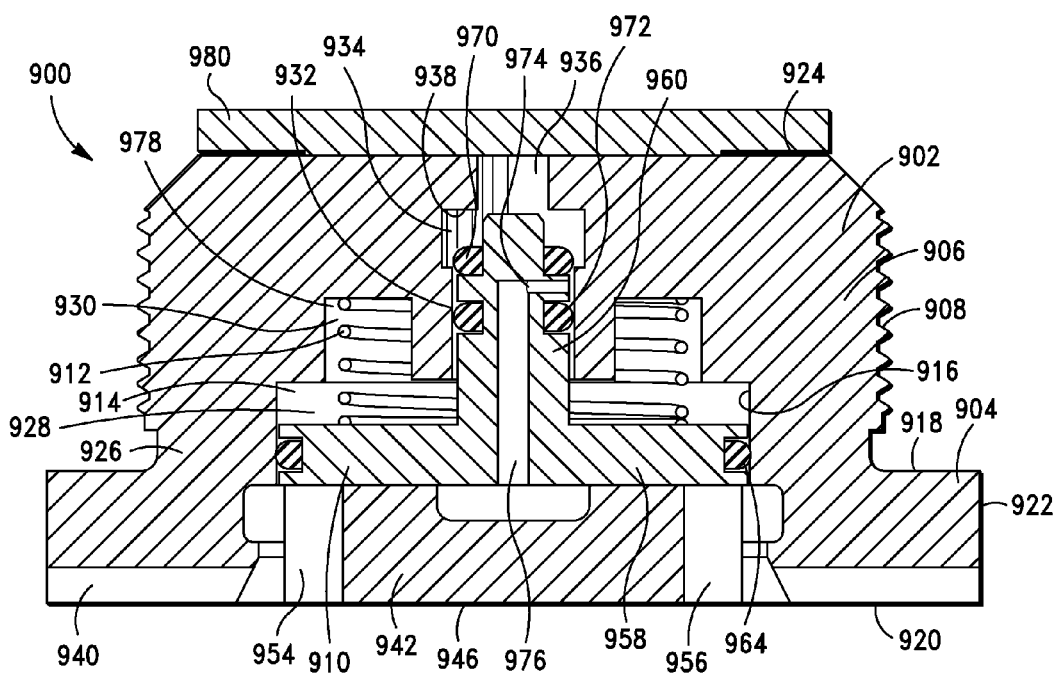
FIG. 12A is a cross-sectional view of a seventh alternative embodiment of control valve shown in an open position.
Figure 12B:
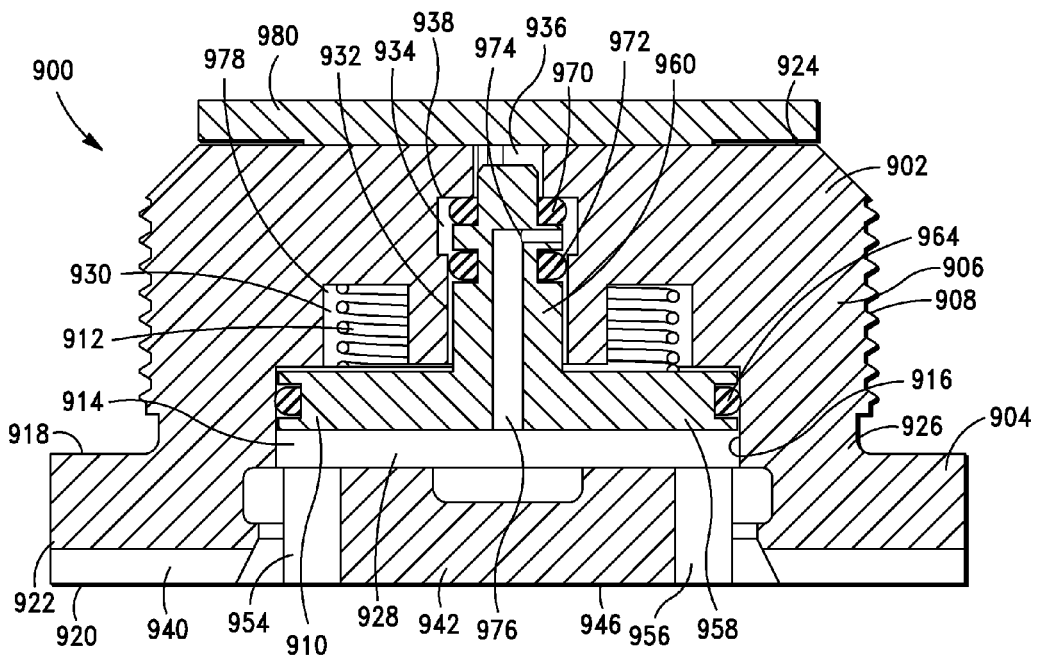
FIG. 12B is a cross-sectional view of the control valve of FIG. 12A shown in a closed position.
Figure 12C:
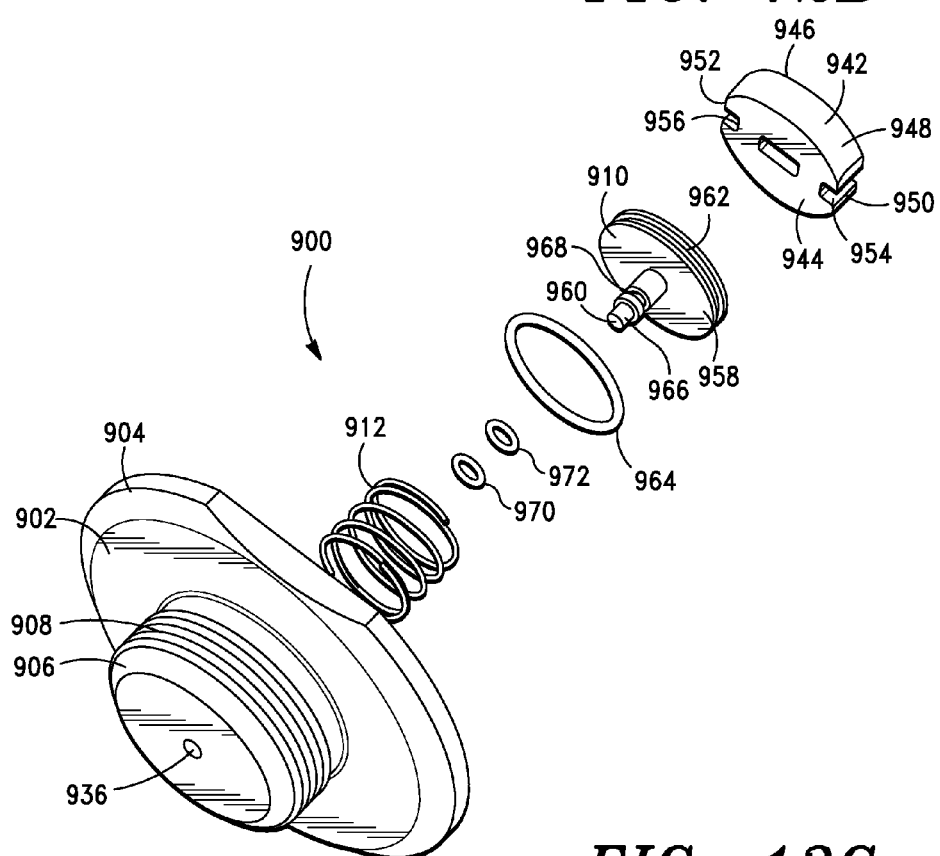
FIG. 12C is an exploded perspective view of the control valve of FIG. 12A.

Referring to FIGS. 12A-12C, an alternative embodiment of control valve is shown generally as 900. Control valve 900 has a valve body 902 having a transfer plate 904 that is joined to a cylindrical protrusion 906. The cylindrical protrusion 906 has a threaded side wall 908 that engages threads 114 on actuator tube 82 (FIG. 1). A seal, or piston, 910 and spring 912 are positioned inside a channel 914 defined by an interior surface 916 of the valve body 902. The transfer plate 904 of the valve body 902 has upper and lower surfaces 918 and 920 joined by a side wall 922. The cylindrical protrusion 906 of the valve body 902 has upper and lower surfaces 924 and 926 joined by threaded side wall 908. The lower surface 926 of the protrusion 906 is joined to the upper surface 918 of the transfer plate 904. The channel 914 through the valve body 902 includes a lower cylindrical section 928, an annular section 930 for retaining spring 912, and first, second, and third upper cylindrical sections 932, 934, and 936. Second cylindrical section 934 has a greater diameter than third cylindrical section 936 such that an annular surface 938 is positioned between the two sections. A groove 940 is formed in the lower surface 920 of the transfer plate 904.

The valve body 902 includes a retainer 942 that is positioned within the channel 914 for retaining seal 910 within the channel 914. The retainer 942 is preferably press fit into the lower section 928 of the channel 914 to retain seal 910 therein. As shown in FIG. 12C, the retainer 942 is circular having upper and lower surfaces 944 and 946 and a side wall 948. Side wall 948 includes two flat edges 950 and 952 formed at opposing sides of the side wall 948. Slots 954 and 956 are formed in the side wall 948 at edges 950 and 952, respectively. As shown in FIG. 12A, the slots 954 and 956 are aligned with the groove 940 in the bottom surface 920 of valve body 902 for providing a continuous flow passage from the bottom surface 920 of valve body 902 through retainer 942 to seal 910. The lower surface 946 of the retainer 942 is flat and flush with the bottom surface 920 of the transfer plate 904.

Seal 910 is positioned in channel 914 between retainer 942 and the upper surface 924 of protrusion 906. The seal 910 includes a disk shaped base 958 and a cylindrical protrusion 960 extending upward from base 958. The base 958 is positioned in the lower section 928 of channel 914, and the protrusion 960 extends upward into the first and second upper sections 932 and 934 of channel 914. Referring to FIG. 12C, a groove 962 is formed in base 958 for receiving an o-ring seal 964, and grooves 966 and 968 are formed in protrusion 960 for receiving o-ring seals 970 and 972, respectively. Seal 964 sealingly engages a portion of interior surface 916 surrounding lower section 928 of channel 914, and seal 972 sealingly engages a portion of interior surface 916 surrounding first upper section 932 of channel 914. Referring to FIG. 12A, there is a horizontal channel 974 formed in the protrusion 960 between seals 970 and 972. Horizontal channel 974 is in fluid communication with a vertical channel 976 that extends downward through the base 958 of seal 910. The seal 910 is preferably made from a rigid or semi-rigid material.

A valve chamber 978 is enclosed by the seal 910 and valve body 902. Seals 964 and 972 are in sealing engagement with the valve body 902 to prevent fluid from entering or exiting the valve chamber 978. The spring 912 is positioned within the valve chamber 978 between a portion of the valve body 902 and the seal 910 for biasing the seal 910 to its open position shown in FIG. 12A.

The seal 910 is moveable between its open position shown in FIG. 12A and the closed position shown in FIG. 12B. In its open position, fluid can flow between the spring chamber 58 and the service brake pressure chamber 38 (FIG. 1) through the second and third upper sections 934 and 936 of channel 914, the horizontal and vertical channels 974 and 976 in seal 910, and the space between seal 910 and retainer 942. When the seal 910 is in its closed position, as shown in FIG. 12B, the o-ring seal 970 engages the annular surface 938 to prevent fluid from flowing between the second and third cylindrical sections 934 and 936 thereby preventing fluid from flowing between the spring chamber 58 and the service brake pressure chamber 38. As described above in connection with control valve 104, the seal 910 moves from its open position to its closed position when the pressure differential between the service brake pressure chamber 38 and valve chamber 978 causes a net force to be exerted on the lower surface of seal 910 that is greater than the force exerted on the seal 910 by spring 912. A filter 980 is securely attached on the top surface of the valve body 902. Filter 980 is preferably similar to the filter 438 of control valve 400.

Figure 13A:
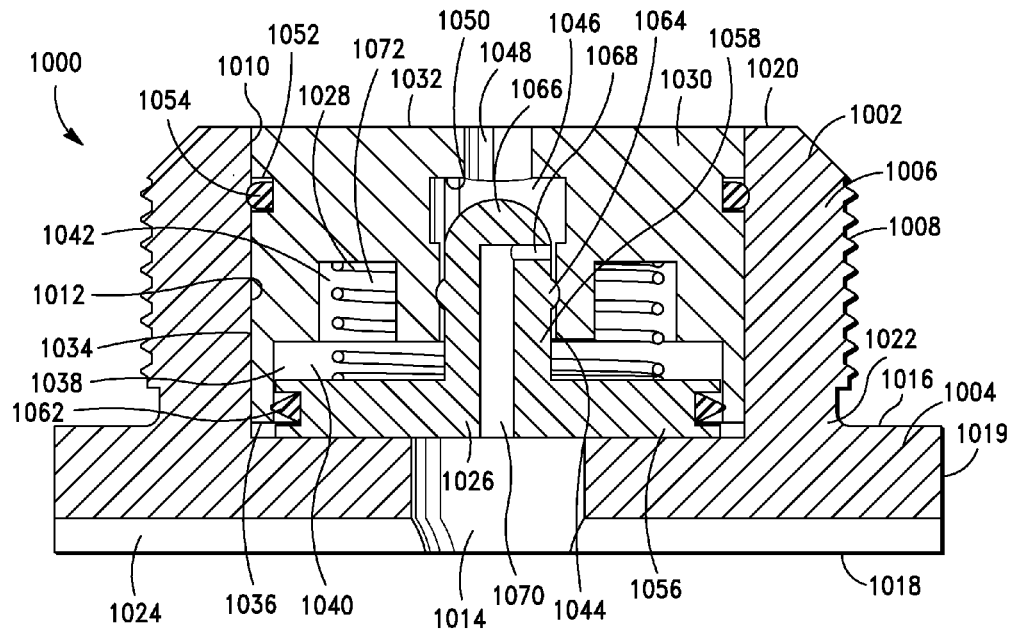
FIG. 13A is a cross-sectional view of an eighth alternative embodiment of control valve shown in an open position.
Figure 13B:
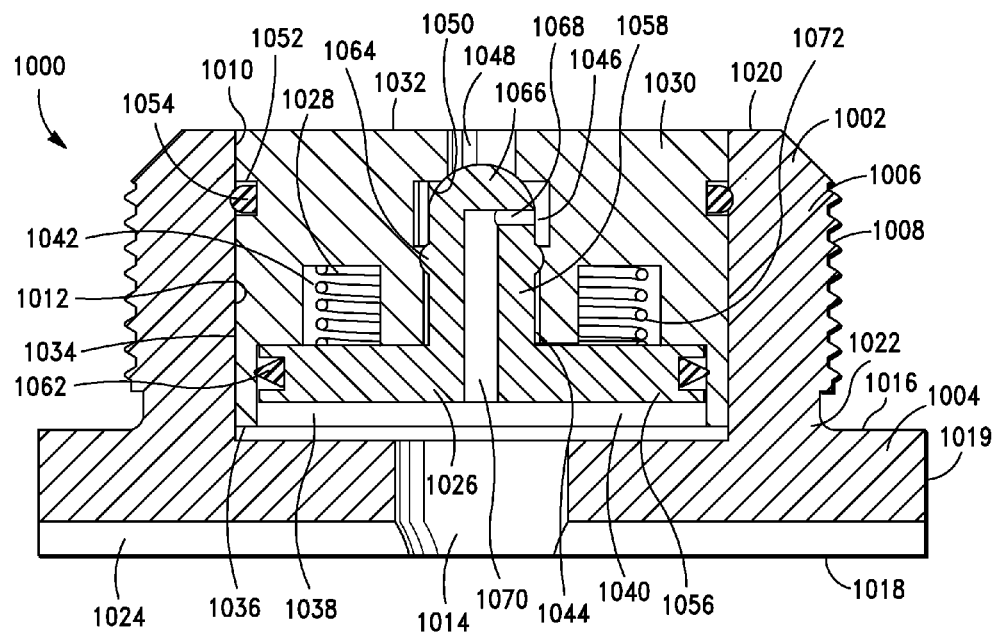
FIG. 13B is a cross-sectional view of the control valve of FIG. 13A shown in a closed position.
Figure 13C:
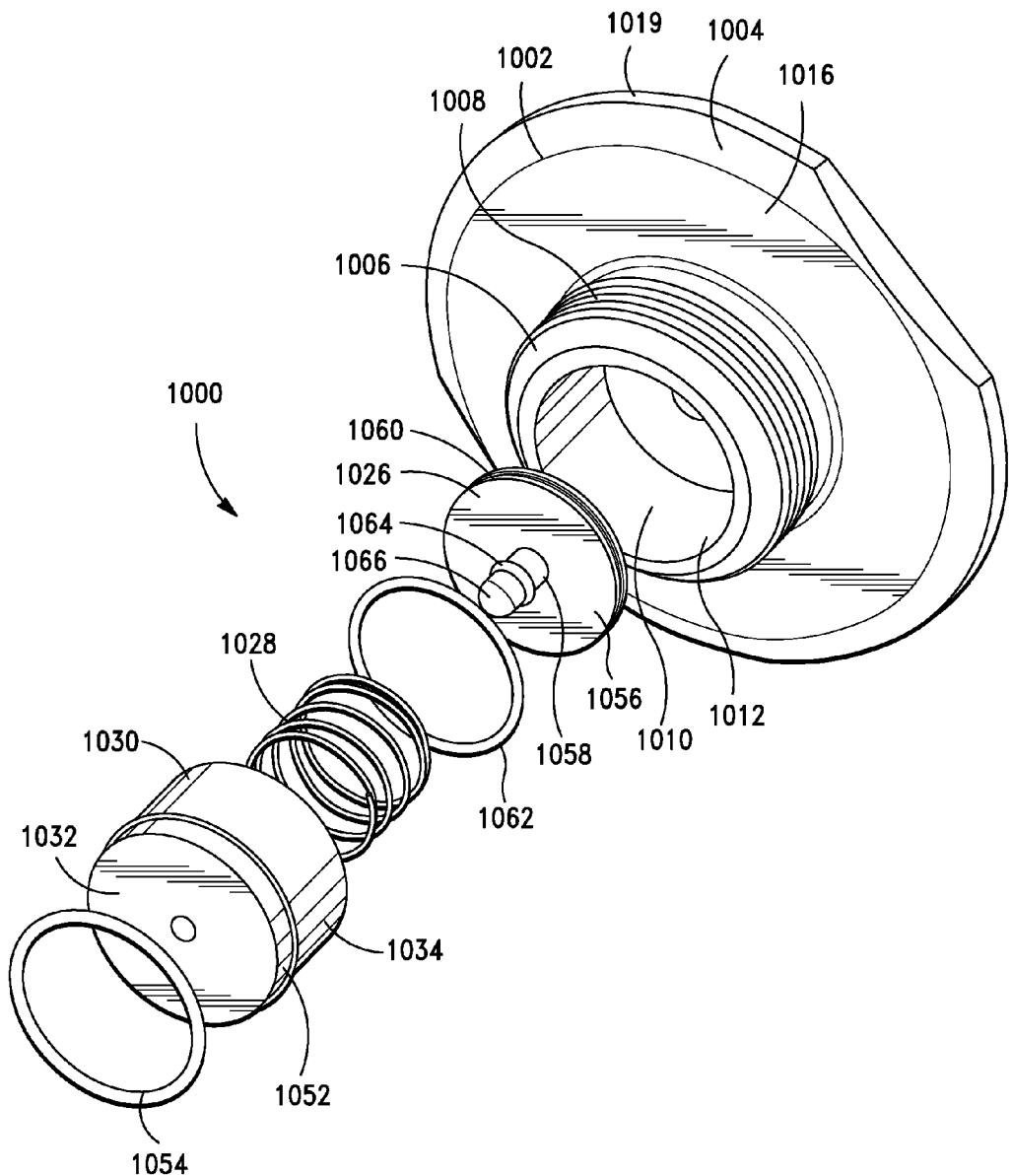
FIG. 13C is an exploded perspective view of the control valve of FIG. 13A.

FIGS. 13A-13C show an alternative embodiment of control valve 1000 in accordance with the present invention. Control valve 1000 has a valve body 1002 with a transfer plate 1004 that is joined to a cylindrical protrusion 1006. The protrusion 1006 has a threaded side wall 1008 that engages threads on actuator tube 82 (FIG. 1). The valve body 1002 defines a channel 1010 including an upper cylindrical section 1012 surrounded by side wall 1008 and a lower cylindrical section 1014 positioned within transfer plate 1004. The transfer plate 1004 has upper and lower surfaces 1016 and 1018, respectively, and a side wall 1019, and the protrusion 1006 has upper and lower surfaces 1020 and 1022, respectively. The upper surface 1016 of transfer plate 1004 is joined to the lower surface 1022 of protrusion 1006. A groove 1024 is formed in the lower surface 1018 of transfer plate 1004.

A seal 1026, spring 1028, and retainer 1030 are positioned within the upper section 1012 of channel 1010. The retainer 1030 is generally cylindrical and has an upper surface 1032, a side wall 1034, and a lower edge 1036. The retainer 1030 has a cavity 1038 with a lower cylindrical section 1040 adjacent lower edge 1036, an annular section 1042 for retaining spring 1028, and first, second, and third upper cylindrical sections 1044, 1046, and 1048. Second cylindrical section 1046 has a greater diameter than third cylindrical section 1048 such that an annular surface 1050 is positioned between the two sections. A groove 1052 is formed in the side wall 1034 of retainer 1030 for receiving a seal 1054 that prevents fluid from flowing between retainer 1030 and valve body 1002.

The seal 1026 has a disk shaped base 1056 and a cylindrical protrusion 1058 extending upward from the base 1056. Referring to FIG. 13C, a groove 1060 is formed in base 1056 for receiving a delta seal 1062. A sealing ring 1064 extends outward from the middle of protrusion 1058. The end 1066 of protrusion 1058 is dome shaped. The base 1056 is positioned in the lower cylindrical section 1040 of the cavity 1038 within retainer 1030. The protrusion 1058 extends upward through the first and second cylindrical sections 1044 and 1046 of the cavity 1038 within retainer 1030. Seal 1062 sealingly engages a portion of retainer 1030, and sealing ring 1064 sealingly engages a portion of retainer 1030. Referring to FIG. 13A, there is a horizontal channel 1068 formed in the protrusion 1058 between sealing ring 1064 and end 1066. Horizontal channel 1068 is in fluid communication with a vertical channel 1070 that extends downward through the base 1056 of seal 1026.

A valve chamber 1072 is enclosed by the seal 1026 and retainer 1030. Seal 1062 and sealing ring 1064 are in sealing engagement with the retainer 1030 to prevent fluid from entering or exiting the valve chamber 1072. The spring 1028 is positioned within the valve chamber 1072 between a portion of the retainer 1030 and the seal 1026 for biasing the seal 1026 to its open position shown in FIG. 13A.

The seal 1026 is moveable between its open position shown in FIG. 13A and the closed position shown in FIG. 13B. In its open position, fluid can flow between the spring chamber 58 and the service brake pressure chamber 38 (FIG. 1) through the second and third upper sections 1046 and 1048 of the cavity 1038 in retainer 1030, the horizontal channel 1068 and vertical channel 1070 in seal 1026, and the lower cylindrical section 1014 of channel 1010. When the seal 1026 is in its closed position, as shown in FIG. 13B, the dome shaped end 1066 of seal 1026 engages the annular surface 1050 of retainer 1030 to prevent fluid from flowing between the second and third upper sections 1046 and 1048 thereby preventing fluid from flowing between the spring chamber 58 and the service brake pressure chamber 38. As described above in connection with control valve 104, the seal 1026 moves from its open position to its closed position when the pressure differential between the service brake pressure chamber 38 and valve chamber 1072 causes a net force to be exerted on the lower surface of seal 1026 that is greater than the force exerted on the seal 1026 by spring 1028.

Figure 14A:
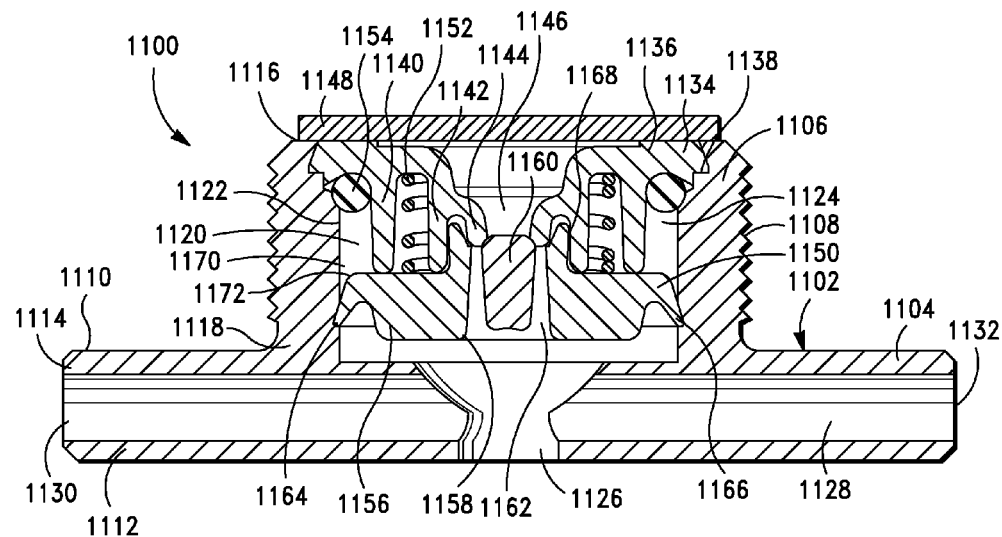
FIG. 14A is a cross-sectional view of a ninth alternative embodiment of control valve shown in a closed position.
Figure 14B:
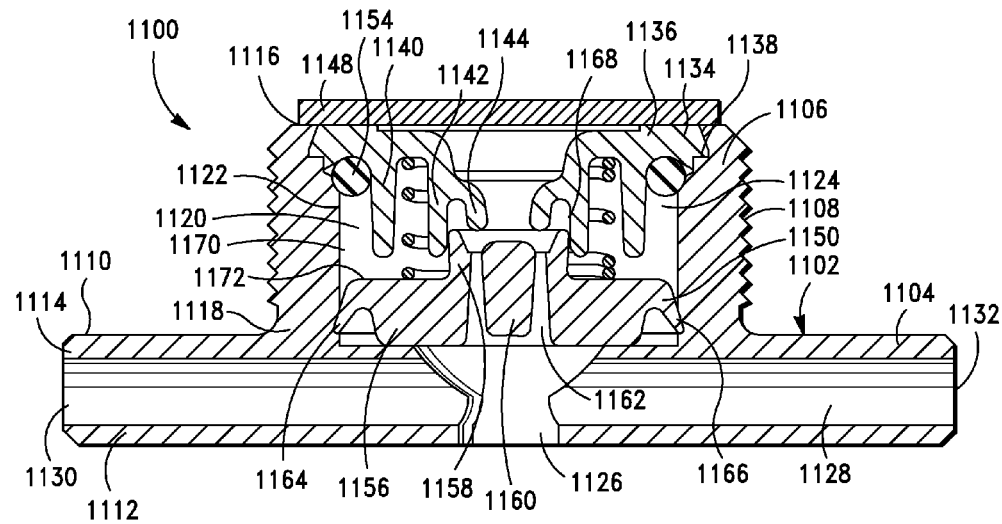
FIG. 14B is a cross-sectional view of the control valve of FIG. 14A shown in an open position.
Figure 14C:
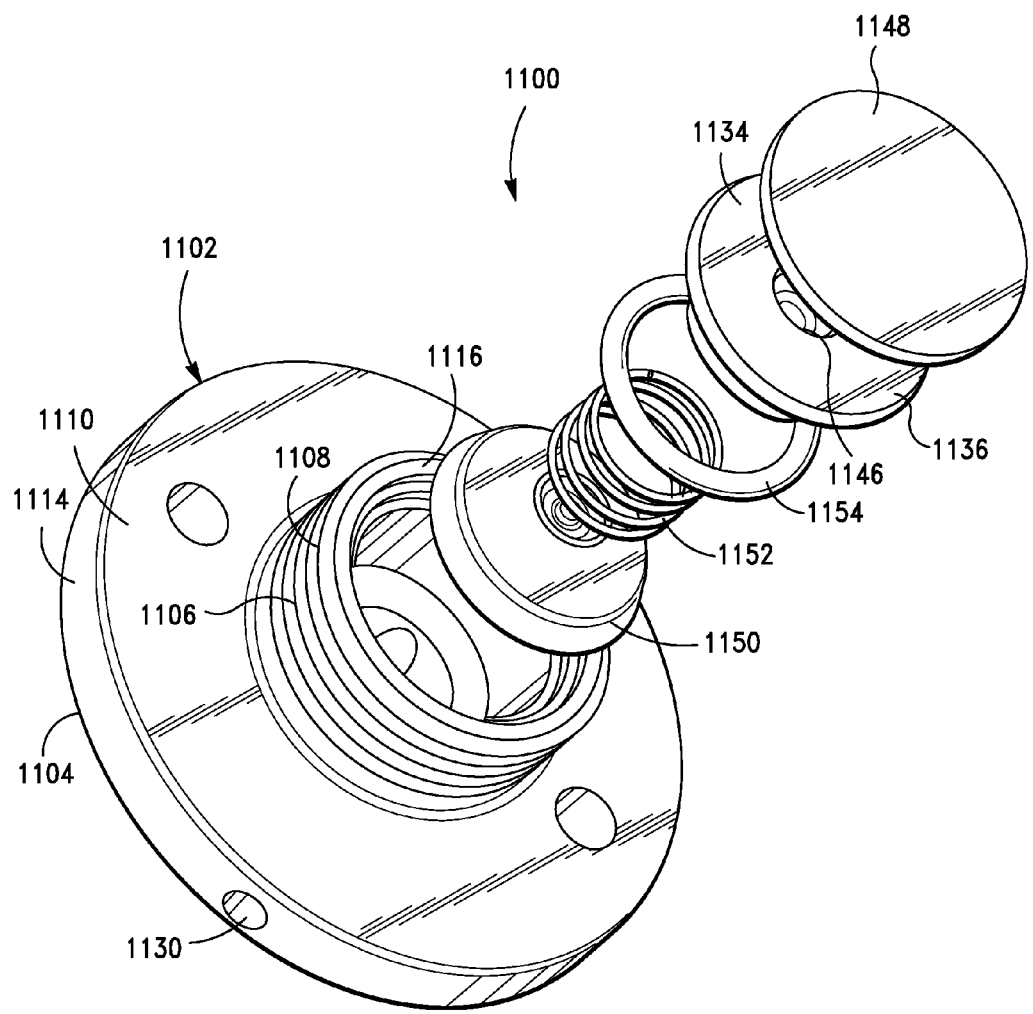
FIG. 14C is an exploded perspective view of the control valve of FIG. 14A.

Referring now to FIGS. 14A-14C, an alternative embodiment of control valve 1100 includes a valve body 1102 with a transfer plate 1104 and a cylindrical protrusion 1106 joined to the transfer plate 1104. The cylindrical protrusion 1106 has a threaded side wall 1108 that engages threads on actuator tube 82 (FIG. 1). The transfer plate 1104 has upper and lower surfaces 1110 and 1112 joined by a side wall 1114. The cylindrical protrusion 1106 has upper and lower surfaces 1116 and 1118 joined by threaded side wall 1108. The lower surface 1118 of the protrusion 1106 is joined to the upper surface 1110 of the transfer plate 1104. A channel 1120 is defined by an interior surface 1122 of the valve body 1102. The channel 1120 includes an upper cylindrical section 1124 that is enclosed by the side wall 1108 of protrusion 1106, a lower vertical section 1126 extending through the transfer plate 1104 from upper surface 1110 to lower surface 1112, and a lower horizontal section 1128 that extends through the transfer plate 1104 between openings 1130 and 1132 in side wall 1114.

The valve body 1102 includes a retainer 1134 that is positioned in the channel 1120, and is preferably press fit into the channel 1120. The retainer 1134 has a disk shaped upper section 1136 that is supported by a ledge 1138 formed in the interior surface 1122. Concentric rings 1140, 1142, and 1144 that are integral with upper section 1136 extend into channel 1120. An opening 1146 extends through the center of retainer 1134. The opening 1146 allows air to flow through the retainer 1134. A filter 1148 is securely attached on the top surface of the valve body 1102.

A seal 1150, spring 1152, and o-ring seal 1154 are positioned inside channel 1120 between retainer 1134 and the upper surface 1110 of transfer plate 1104. The retainer 1134 retains the seal 1150 within the channel 1120. The o-ring seal 1154 is positioned between ring 1140 and the interior surface 1122 to form a seal and prevent air from flowing between the retainer 1134 and interior surface 1122.

The seal 1150 includes a disk shaped base 1156 and a cylindrical protrusion 1158 integral with and extending upward from the base 1156. A cylindrical plug 1160 is positioned in the center of the seal 1150, and a plurality of openings, one of which is shown as 1162, are positioned around the plug 1160 and extend through the seal 1150. A flange 1164 extends outward from the base 1156 of the seal 1150 and includes a peripheral surface 1166 that sealingly engages the interior surface 1122 of the valve body 1102. The protrusion 1158 includes an outer surface 1168 that sealingly engages the ring 1142 on retainer 1134. The base 1156 has a lower surface with five radial grooves (not shown) formed therein similar to those shown on the seal 136 in FIG. 5D. The channel 1120 and lower surface of seal 1150 have a similar configuration as described above in connection with valve 104 shown in FIGS. 5A-5D for allowing air to reach a larger portion of the bottom of seal 1150.

A valve chamber 1170 is enclosed by the seal 1150 and valve body 1102. The outer surface 1168 of protrusion 1158 and flange 1164 on seal 1150 are in sealing engagement with valve body 1102 to prevent fluid from entering or exiting valve chamber 1170. The valve chamber 1170 is not in fluid communication with spring chamber 58 or service brake pressure chamber 38. Spring 1152 is positioned within valve chamber 1170 between retainer 1134 and seal 1150. The spring 1152 is positioned around ring 1142 to retain it in place within the chamber 1170. One end of the spring 1152 abuts retainer 1134 and the other end of the spring 1152 abuts an upper surface 1172 of the base 1156 of seal 1150.

The seal 1150 is moveable between an open position, as shown in FIG. 14B in which fluid can flow between the spring chamber 58 and the service brake pressure chamber 38 through the channel 1120 of the valve body 1102 and the opening 1162 in the seal 1150, and a closed position, as shown in FIG. 14A in which fluid is blocked from flowing between the spring chamber 58 and service brake pressure chamber 38. When the seal 1150 is in its closed position, the opening 1146 in retainer 1134 receives a portion of the plug 1160 of seal 1150, which is slightly larger than the opening 1146 so that it blocks the opening 1146 and prevents fluid from flowing between the two. The seal 1150 is biased to its open position by spring 1152. As described above in connection with control valve 104, the seal 1150 moves from its open position to its closed position when the pressure differential between the service brake pressure chamber 38 and valve chamber 1170 causes a net force to be exerted on the lower surface of seal 1150 that is greater than the force exerted on the seal 1150 by spring 1152.

While the following description of the operation of the brake actuator 10 is applicable to use of the brake actuator 10 with any of the control valves 104, 300, 400, 500, 600, 700, 800, 900, 1000, and 1100 described above, only control valve 104 is referenced below for convenience.

Figure 2:
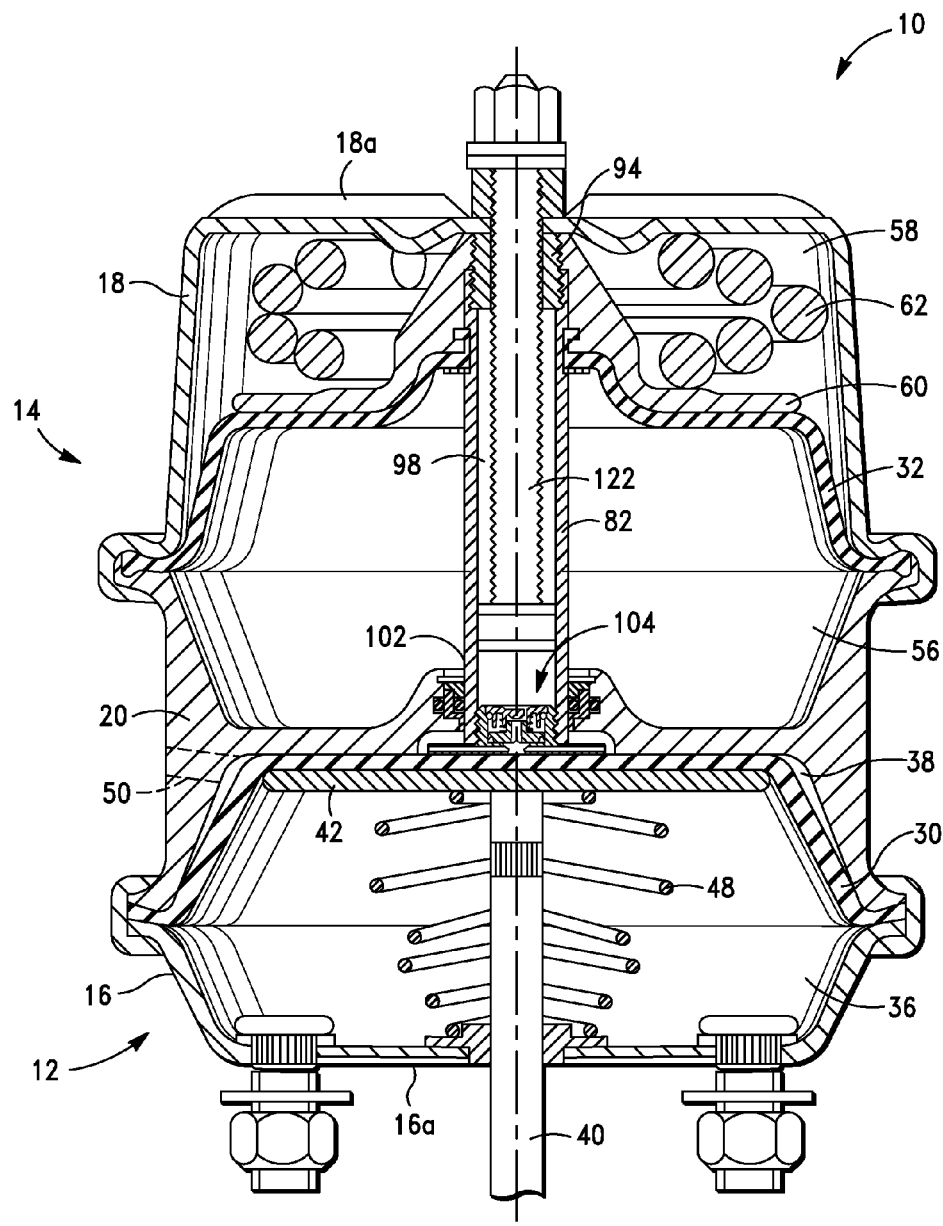
FIG. 2 is a cross-sectional view of the brake actuator of FIG. 1 showing the caging bolt in an extended position.
Figure 4:
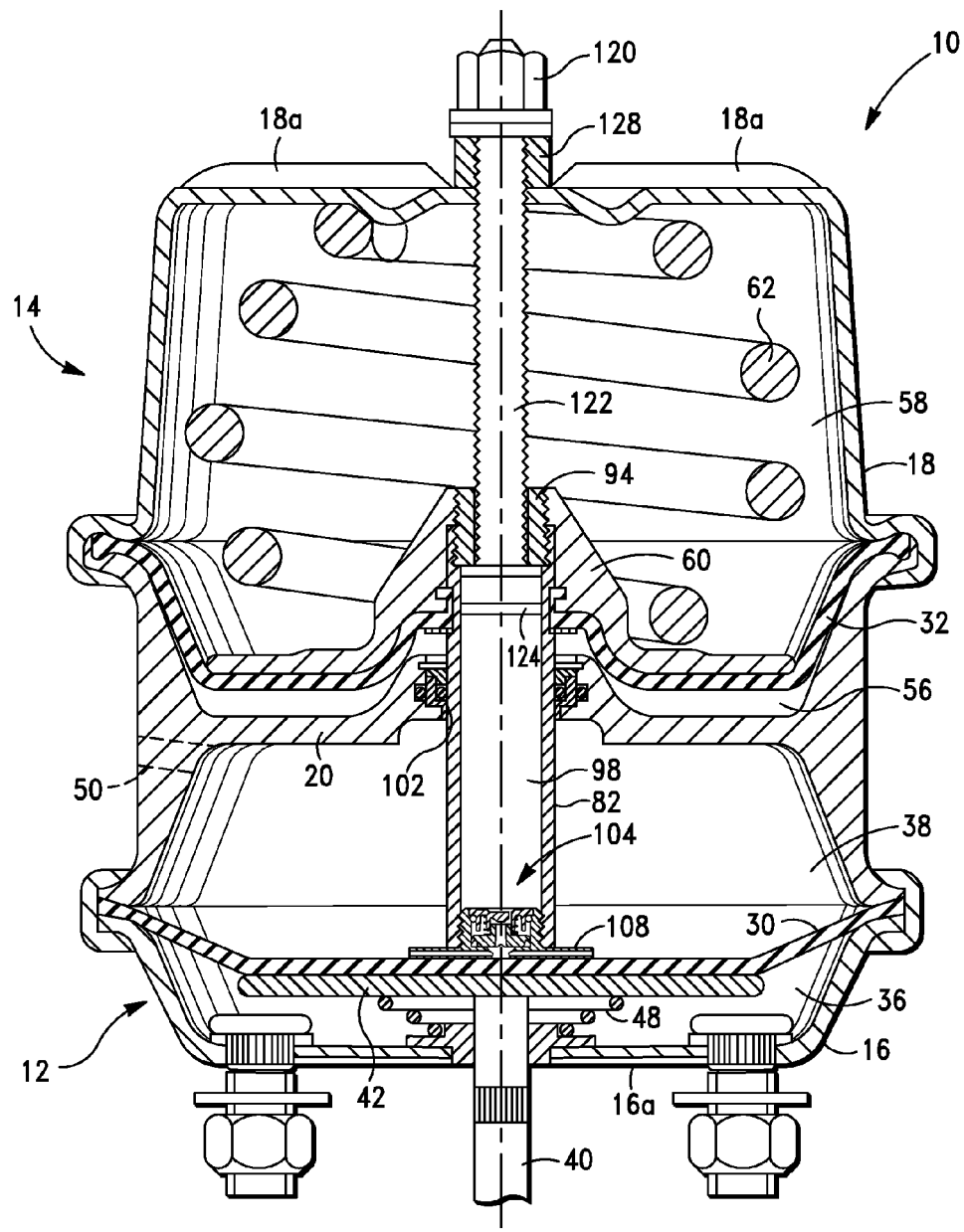
FIG. 4 is a cross-sectional view of the brake actuator of FIG. 1 showing the spring brake actuator applied.

In operation, the spring brake actuator 14 is moveable between the engaged position shown in FIG. 4 and the disengaged position shown in FIG. 2. When the vehicle on which brake actuator 10 is installed is parked for an extended period of time, the spring brake actuator 14 is typically in the engaged position shown in FIG. 4. In the engaged position, pressure is released from the spring brake pressure chamber 56 so that the compression spring 62 pushes the pressure plate 60 and the diaphragm 32 toward the adapter housing 20. As a result, the actuator tube 82 connected to the pressure plate 60 is pushed through the opening 102 in the adapter housing 20 and the transfer plate 108 of the control valve 104 forces the diaphragm 30 and pressure plate 42 toward the end wall 16a of the service brake actuator housing 16. This forces the majority of pushrod 40 out of the housing 16 and actuates the vehicle's parking or emergency brakes. When the spring brake actuator 14 is in the engaged position shown in FIG. 4, the vehicle on which the brake actuator 10 is installed cannot move. To allow the vehicle to move, the spring 62 must be retracted either by pressurizing the spring brake pressure chamber 56, as shown in FIG. 2, or by mechanically retracting the spring 62 with caging bolt 122, as shown in FIG. 1 and described above. Mechanical retraction of spring 62 with caging bolt 122 is typically only necessary during assembly of the brake actuator 10 and/or when mechanical release of the actuator 10 is necessary due to a failure or absence of the compressed air system.

When spring brake pressure chamber 56 is pressurized, diaphragm 32 and pressure plate 60 retract spring 62 and compress it against housing wall 18a to move the spring brake actuator 14 to its disengaged position, as shown in FIG. 2. The movement of pressure plate 60 causes actuator tube 82 to retract upward through opening 102 in adapter housing 20 thereby releasing pressure on diaphragm 30 and pressure plate 42. Spring 48 then biases pressure plate 42 and pushrod 40 to the position shown in FIG. 2 in which the vehicle's parking brakes are released. Bearing 94 allows the pressure plate 60 and actuator tube 82 to move with respect to the caging bolt 122 from the position shown in FIG. 2 to the position shown in FIG. 4 while preventing damage to the pressure plate 60, actuator tube 82, and caging bolt 122. The inner surface 97 of the bearing 94 is in close contact with the threads of the caging bolt to guide movement of the pressure plate 60 and actuator tube 82. The inner surface 97 of the bearing 94 is preferably relatively smooth to minimize damage to the threads of the caging bolt 122.

As spring brake pressure chamber 56 is pressurized to release the vehicle's parking brakes, the volume of the pressure chamber 56 increases due to the retraction of spring 62. As the volume of chamber 56 increases, the volume of spring chamber 58 decreases thereby increasing the pressure of the air contained therein. The pressurized air in the spring chamber 58 is fluidly connected to the control valve 104 through the bearing 94 and the interior space 98 of the actuator tube 82. As long as service brake pressure chamber 38 has not been pressurized while the spring brake actuator 14 is actuated, the seal 136 in the control valve 104 is in its open position, shown in FIG. 5A, when the spring brake actuator 14 is actuated. The seal 136 remains in its open position as spring brake pressure chamber 56 is pressurized, which allows the pressurized air in spring chamber 58 to flow through control valve 104 into service brake pressure chamber 38. That air can be released from service brake pressure chamber 38 through inlet port 50. In this manner, the pressure build-up in the spring chamber 58 is effectively released by operation of the control valve 104 of the invention, without providing a vent opening in the spring chamber 58.

When the spring brake actuator 14 is applied by exhausting the pressurized air from the spring brake pressure chamber 56 of the spring brake actuator 14, the volume of the spring chamber 58 expands causing the pressure within the chamber 58 to drop. Air flows through the control valve 104 from the service brake pressure chamber 38 into the spring chamber 58 in order to prevent the formation of a vacuum in the spring chamber 58 and allow the spring brake actuator 14 to engage in a timely manner. During engagement of the spring brake actuator 14, the seal 136 remains in its open position to allow air to flow through the control valve 104. The spring 138 that biases the seal 136 to its open position is configured so that it is able to maintain the seal 136 in its open position during engagement of the spring brake actuator 14 by resisting force exerted on the seal 136 due to the pressure differential between the spring chamber 58 and valve chamber 208 caused by expansion of the spring chamber 58.

Figure 3:
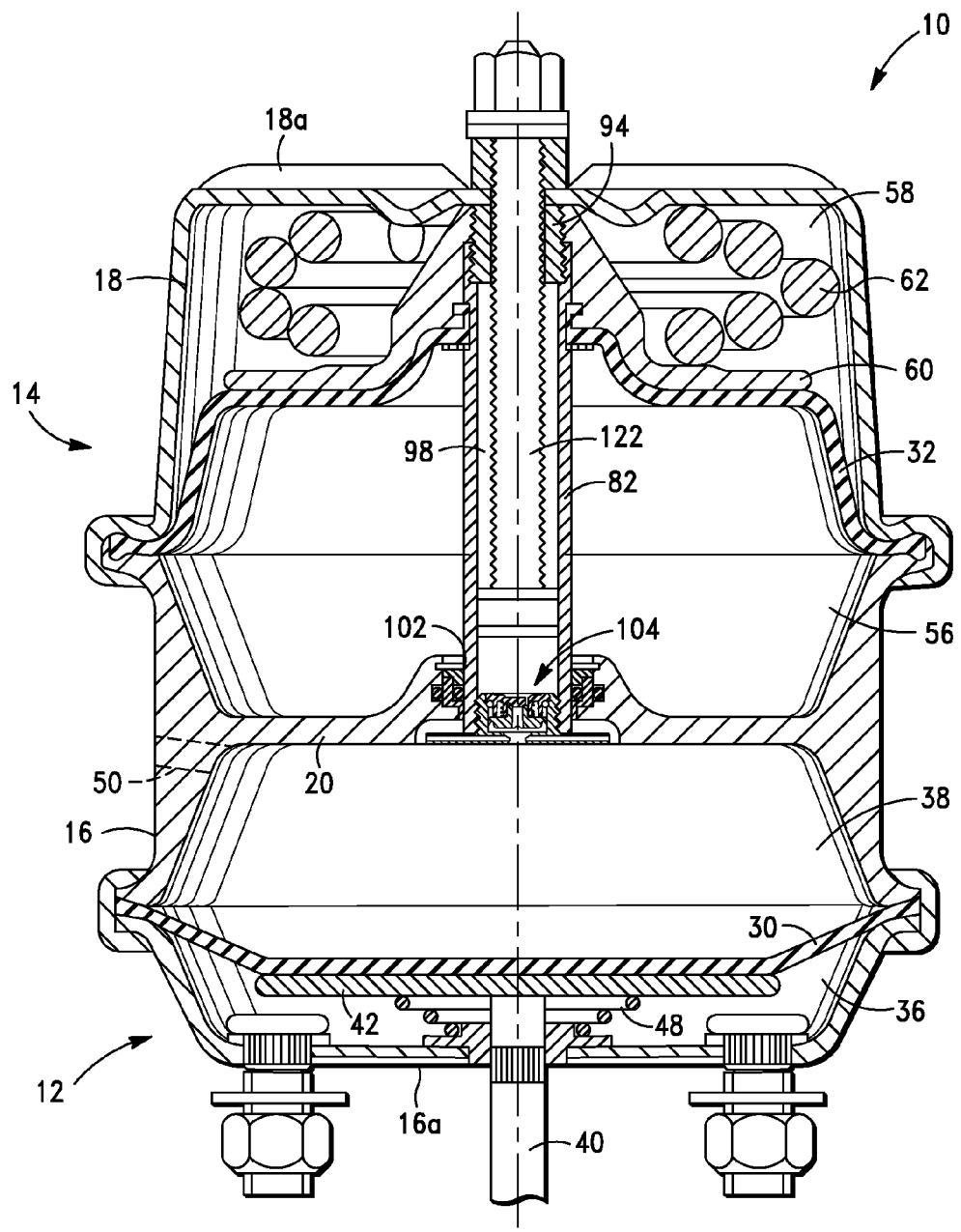
FIG. 3 is a cross-sectional view of the brake actuator of FIG. 1 showing the service brake actuator applied.

When the spring brake actuator 14 is in the disengaged position shown in FIGS. 2 and 3 and the vehicle on which the brake actuator 10 is installed is in transit, the service brake actuator 12 is utilized to brake the vehicle. The service brake actuator 12 moves between the disengaged position shown in FIG. 2 and the engaged position shown in FIG. 3. When in the disengaged position shown in FIG. 2, the pushrod 40 is retracted to a position that does not actuate the vehicle's brakes. To actuate the vehicle's service brakes, air enters the service brake pressure chamber 38 through inlet port 50. As the pressure in chamber 38 builds it forces diaphragm 30, pressure plate 42, and pushrod 40 toward end wall 16a into the position shown in FIG. 3 thereby overcoming spring 48 and actuating the vehicle's service brakes.

As the pressure builds in service brake pressure chamber 38 and the service brake actuator 12 moves from its disengaged position to its engaged position, the seal 136 in control valve 104 moves from its open position to its closed position in order to prevent the undesirable increase of pressure in spring chamber 58. Because the control valve 104 is a pilot operated valve that closes based on the pressure in service brake pressure chamber 38 regardless of the rate of flow of fluid through the valve 104 or the pressure differential between service brake pressure chamber 38 and spring chamber 58, the valve 104 is able to prevent the undesirable build up of pressure in spring chamber 58 even when air is slowly introduced into pressure chamber 38 through inlet port 50. This is in contrast to conventional pneumatic brake actuator control valves which are flow rate dependent and allow air to flow through them and pressurize the spring chamber when the service brakes are slowly applied. Because the control valves 104, 300, 400, 500, 600, 700, 800, 900, and 1000 described herein are insensitive to the rate of flow of fluid moving through them and the pressure differential between the spring chamber 58 and service brake pressure chamber 38, they prevent pressure build up in the spring chamber 58 while the service brake actuator 12 is engaged, which prevents damage to the brake actuator and vehicle's braking components caused by the simultaneous application of the service and spring brake actuators 12 and 14.

When the service brake actuator 12 is moved from its engaged position to its disengaged position by exhausting the air within service brake pressure chamber 38, the seal 136 in control valve 104 moves from its closed position to its open position to again allow air flow between the spring chamber 58 and pressure chamber 38.

As described above, one advantage of the sealed pneumatic brake actuator 10 according to the invention is that the spring brake actuator 14 is completely sealed with respect to the atmosphere, which prevents moisture from entering the spring chamber 58 and corroding the spring 62. The control valve 104 with two-way communication or breathing ability permits the relief of pressure build up in the sealed spring chamber 58 and it also prevents a vacuum from forming in the spring chamber 58 when the spring brake actuator 14 is engaged. Therefore, spring 62 does not need an enhanced spring force to overcome the effects of vacuum generation in the spring chamber 58, as is common with some conventional pneumatic brake actuators.

While all of the control valves 104, 300, 400, 500, 600, 700, 800, 900, 1000, and 1100 described herein include a spring that biases the seal of the valve to its open position, it is within the scope of the invention for something other than a spring to bias the seal of each valve to its open position. For example, the seal itself could be manufactured from a material and configured in such a way that it biases itself to its open position and rebounds to that position when the pressure in service brake pressure chamber 38 subsides. Alternatively, during construction of each of the valves described herein, the valve chamber (e.g., valve chamber 208 shown in FIG. 5A) that is enclosed by the seal and valve body may be pressurized with a fluid, which pressure biases the seal to its open position so that no spring is necessary to bias the seal to its open position. Additionally, it is within the scope of the invention for any of the o-ring seals, delta seals, and square seals described above and shown in the drawings to be interchanged with each other or with quad ring seals.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement

What is claimed and desired to be secured by Letters Patent is as follows:

1. A pneumatic brake actuator, comprising:
    a spring brake actuator comprising a spring chamber and a spring brake pressure chamber;
    a service brake actuator coupled with said spring brake actuator and comprising a service brake pressure chamber and a pushrod chamber; and
    a control valve operable to regulate fluid flow between said spring chamber and said service brake pressure chamber, said control valve comprising a seal moveable between an open position in which fluid can flow between said spring chamber and said service brake pressure chamber and a closed position in which fluid is blocked from flowing between said spring chamber and said service brake pressure chamber, wherein said seal comprises first and second surfaces, wherein said first surface is in fluid communication with said service brake pressure chamber, wherein said second surface is in fluid communication with a valve chamber that is not in fluid communication with said spring chamber or said service brake pressure chamber, and wherein said seal moves between said open position and said closed position based on a pressure in said service brake pressure chamber;
    wherein said control valve comprises a valve body with a channel formed therein for allowing fluid to flow between said spring chamber and said service brake pressure chamber when said seal is in its open position, wherein an interior surface of said valve body defines said channel, wherein said seal is positioned within said channel and blocks fluid from flowing through said channel when in its closed position, and wherein said valve chamber is enclosed by said seal and said valve body,
    wherein said seal comprises a first sealing surface that engages said valve body when said seal is in its closed position to block fluid from flowing through said channel, and second and third sealing surfaces each of which engages said valve body to seal said valve chamber from said spring chamber and said service brake pressure chamber,
    wherein said valve body comprises a transfer plate comprising upper and lower surfaces joined by a side wall, a cylindrical protrusion comprising upper and lower surfaces joined by a side wall, wherein said lower surface of said protrusion is joined to said upper surface of said transfer plate, and a retainer that is positioned within said channel to retain said seal within said channel, and
    wherein said channel comprises an inlet in said upper surface of said protrusion and an outlet in said lower surface of said transfer plate.

2. The brake actuator of claim 1, wherein said pressure in said service brake pressure chamber comprises a first pressure, and a pressure in said valve chamber comprises a second pressure, wherein a first force is exerted on said first surface due to said first pressure acting on said first surface, wherein a second force is exerted on said second surface due to said second pressure acting on said second surface, and wherein said seal moves from said open position to said closed position when said first force is greater than said second force.

3. The brake actuator of claim 2, further comprising a spring that exerts a third force on said second surface, and wherein said seal moves from said open position to said closed position when said first force exceeds the sum of said second and third forces.

4. The brake actuator of claim 1, wherein said control valve is a pilot operated valve and a pilot pressure operating the valve is said pressure in said service brake pressure chamber.

5. The brake actuator of claim 1, wherein movement of said seal from said open position to said closed position is not dependent on the rate of flow of fluid between said spring chamber and said service brake pressure chamber.

6. The brake actuator of claim 1, wherein movement of said seal from said open position to said closed position is not dependent on the difference between said pressure in said service brake pressure chamber and a pressure in said spring chamber.

7. The brake actuator of claim 1, wherein said seal presents an opening that is in fluid communication with said spring chamber and said service brake pressure chamber when said seal is in its open position, wherein said first sealing surface surrounds said opening, wherein said seal is positioned within said channel between said retainer and said upper surface of said transfer plate, wherein said retainer comprises a plug that is received by said opening in said seal and engages said first sealing surface when said seal is in its closed position, and wherein said second sealing surface engages said interior surface of said valve body and said third sealing surface engages said retainer.

8. The brake actuator of claim 1, wherein said seal is biased to said open position.

9. The brake actuator of claim 1, wherein said spring chamber is sealed.

10. The brake actuator of claim 1, wherein said spring brake actuator further comprises:
    a first housing comprising first and second end walls and a side wall joined with and extending between said first and second end walls, wherein said second end wall presents an opening;
    an actuator tube comprising a side wall that encloses an interior space which is in fluid communication with said spring chamber, wherein said actuator tube extends from a first end positioned in said spring chamber through said opening in said second end wall to a second end positioned in said service brake pressure chamber, wherein said protrusion of said valve body is coupled with said side wall of said actuator tube at said second end of said actuator tube and said protrusion is received within said interior space of said actuator tube;
    a first diaphragm extending from a peripheral edge that engages said side wall of said first housing to an interior edge that is coupled with said side wall of said actuator tube at said first end of said actuator tube, wherein said first diaphragm divides said first housing into said spring chamber positioned between said first diaphragm and said first end wall and said spring brake pressure chamber positioned between said first diaphragm and said second end wall, wherein said first diaphragm and actuator tube are moveable between a spring brake disengaged position when said spring brake pressure chamber is pressurized with fluid and a spring brake engaged position when said spring brake pressure chamber is exhausted; and
    a spring positioned in the spring chamber that biases the first diaphragm and actuator tube toward the spring brake engaged position.

11. The brake actuator of claim 10, wherein a seal structure or sealant is positioned between said protrusion of said valve body and said side wall of said actuator tube.

12. The brake actuator of claim 10, wherein said service brake actuator further comprises:
- a second housing comprising first and second end walls and a side wall joined with and extending between said first and second end walls, wherein said second end wall of said spring brake actuator is joined with said second end wall of said service brake actuator and said second end wall of said service brake actuator presents an opening aligned with said opening in said second end wall of said spring brake actuator;
- a pushrod extending through an opening in said first end wall of said second housing and comprising a first end positioned in said pushrod chamber and a second end; and
- a second diaphragm comprising a peripheral edge that engages said side wall of said second housing, wherein said second diaphragm divides said second housing into said service brake pressure chamber positioned between said second diaphragm and said second end wall of said second housing and said pushrod chamber positioned between said second diaphragm and said first end wall of said second housing, wherein said second diaphragm and said pushrod are moveable between a service brake engaged position when said service brake pressure chamber is pressurized with fluid and a service brake disengaged position when said service brake pressure chamber is exhausted.

13. A pneumatic brake actuator, comprising:
- a spring brake actuator comprising a spring chamber and a spring brake pressure chamber;
- a service brake actuator coupled with said spring brake actuator and comprising a service brake pressure chamber and a pushrod chamber; and
- a control valve operable to regulate fluid flow between said spring chamber and said service brake pressure chamber, said control valve comprising a seal moveable between an open position in which fluid can flow between said spring chamber and said service brake pressure chamber and a closed position in which fluid is blocked from flowing between said spring chamber and said service brake pressure chamber, wherein said seal comprises first and second surfaces, wherein said first surface is in fluid communication with said service brake pressure chamber, wherein said second surface is in fluid communication with a valve chamber that is not in fluid communication with said spring chamber or said service brake pressure chamber, and wherein said seal moves between said open position and said closed position based on a pressure in said service brake pressure chamber;
- wherein said control valve comprises a valve body with a channel formed therein for allowing fluid to flow between said spring chamber and said service brake pressure chamber when said seal is in its open position, wherein an interior surface of said valve body defines said channel, wherein said seal is positioned within said channel and blocks fluid from flowing through said channel when in its closed position, and wherein said valve chamber is enclosed by said seal and said valve body,
- wherein said seal comprises a first sealing surface that engages said valve body when said seal is in its closed position to block fluid from flowing through said channel, and second and third sealing surfaces each of which engages said valve body to seal said valve chamber from said spring chamber and said service brake pressure chamber,
- wherein said valve body comprises a transfer plate comprising upper and lower surfaces joined by a side wall, a cylindrical protrusion comprising upper and lower surfaces joined by a side wall, wherein said lower surface of said protrusion is joined to said upper surface of said transfer plate, and a retainer that is positioned within said channel to retain said seal within said channel, and
- wherein said seal presents an opening that is in fluid communication with said spring chamber and said service brake pressure chamber when said seal is in its open position, wherein said first sealing surface surrounds said opening, wherein said seal is positioned within said channel between said retainer and said upper surface of said transfer plate, wherein said retainer comprises a plug that is received by said opening in said seal and engages said first sealing surface when said seal is in its closed position, and wherein said second sealing surface engages said interior surface of said valve body and said third sealing surface engages said retainer.

14. The brake actuator of claim 13, wherein said pressure in said service brake pressure chamber comprises a first pressure, and a pressure in said valve chamber comprises a second pressure, wherein a first force is exerted on said first surface due to said first pressure acting on said first surface, wherein a second force is exerted on said second surface due to said second pressure acting on said second surface, and wherein said seal moves from said open position to said closed position when said first force is greater than said second force.

15. The brake actuator of claim 14, further comprising a spring that exerts a third force on said second surface, and wherein said seal moves from said open position to said closed position when said first force exceeds the sum of said second and third forces.

16. The brake actuator of claim 13, wherein said control valve is a pilot operated valve and a pilot pressure operating the valve is said pressure in said service brake pressure chamber.

17. The brake actuator of claim 13, wherein movement of said seal from said open position to said closed position is not dependent on the rate of flow of fluid between said spring chamber and said service brake pressure chamber.

18. The brake actuator of claim 13, wherein movement of said seal from said open position to said closed position is not dependent on the difference between said pressure in said service brake pressure chamber and a pressure in said spring chamber.

19. The brake actuator of claim 13, wherein said seal is biased to said open position.

20. The brake actuator of claim 13, wherein said spring chamber is sealed.

* * * * *